United States Patent
Yamamoto et al.

(10) Patent No.: US 9,815,498 B2
(45) Date of Patent: Nov. 14, 2017

(54) VEHICLE BODY STRUCTURE

(71) Applicant: TOYOTA JIDOSHA KABUSHIKI KAISHA, Toyota-shi (JP)

(72) Inventors: Yohei Yamamoto, Nagoya (JP); Koui Hata, Toyota (JP); Taichi Minei, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 15 days.

(21) Appl. No.: 14/782,525

(22) PCT Filed: Sep. 27, 2013

(86) PCT No.: PCT/JP2013/076437
§ 371 (c)(1),
(2) Date: Oct. 5, 2015

(87) PCT Pub. No.: WO2014/167742
PCT Pub. Date: Oct. 16, 2014

(65) Prior Publication Data
US 2016/0046325 A1 Feb. 18, 2016

(30) Foreign Application Priority Data
Apr. 9, 2013 (JP) ................................. 2013-081638

(51) Int. Cl.
*B62D 25/04* (2006.01)
*B62D 21/15* (2006.01)
(Continued)

(52) U.S. Cl.
CPC .......... *B62D 25/04* (2013.01); *B62D 21/152* (2013.01); *B62D 25/06* (2013.01); *B62D 29/002* (2013.01); *B62D 29/04* (2013.01)

(58) Field of Classification Search
CPC ............................. B62D 25/04; B62D 21/152
(Continued)

(56) References Cited

U.S. PATENT DOCUMENTS 6,494,525 B1 12/2002 Blank
6,705,668 B1 3/2004 Makita et al.
(Continued)

FOREIGN PATENT DOCUMENTS

CN 201089483 Y 7/2008
CN 201193053 Y 2/2009
(Continued)

OTHER PUBLICATIONS

Office Action issued Aug. 5, 2016 in Chinese Patent Application No. 201380075429.0.
(Continued)

*Primary Examiner* — Jason S Morrow
(74) *Attorney, Agent, or Firm* — Oblon, McClelland, Maier & Neustadt, L.L.P.

(57) ABSTRACT

A vehicle body structure includes a roof side rail, resin first and second reinforcement members, and a front pillar. The roof side rail is disposed along a vehicle front-rear direction at both vehicle width direction sides of a roof, and is configured, by roof side rail inner and outer panels and a side outer panel, as a beam-shaped vehicle body framework member with a closed hollow cross-section structure including third and fourth closed cross-section portions. The first reinforcement member, as viewed from the side of the vehicle, is disposed to contain a connection position, at a front portion of the roof side rail, to a front roof header disposed along an upper end portion of a windshield glass, and is provided along a length direction of the front portion to fill at least a portion of a space inside a closed hollow cross-section portion at the front portion.

3 Claims, 18 Drawing Sheets

(51) Int. Cl.
*B62D 25/06* (2006.01)
*B62D 29/04* (2006.01)
*B62D 29/00* (2006.01)

(58) Field of Classification Search
USPC .................................. 296/193.06, 187.1, 30
See application file for complete search history.

(56) References Cited

U.S. PATENT DOCUMENTS

| | | | |
|---|---|---|---|
| 9,187,135 B1* | 11/2015 | Redmer | B62D 25/025 |
| 2002/0033617 A1 | 3/2002 | Blank | |
| 2004/0201253 A1 | 10/2004 | Kitagawa et al. | |
| 2008/0143148 A1* | 6/2008 | Lee | B62D 25/04 |
| | | | 296/202 |
| 2009/0048741 A1 | 2/2009 | Pipkorn | |
| 2012/0181815 A1* | 7/2012 | Gentsch | B62D 25/04 |
| | | | 296/146.6 |
| 2016/0257344 A1* | 9/2016 | Hasegawa | B62D 25/025 |
| 2016/0264183 A1* | 9/2016 | Saito | B62D 25/04 |
| 2017/0036703 A1* | 2/2017 | Maeda | B62D 25/04 |

FOREIGN PATENT DOCUMENTS

| | | |
|---|---|---|
| JP | 2000-25647 A | 1/2000 |
| JP | 2000-142466 A | 5/2000 |
| JP | 2001-138845 A | 5/2001 |
| JP | 2002-220024 A | 8/2002 |
| JP | 2003-205868 A | 7/2003 |
| JP | 2003-237622 A | 8/2003 |
| JP | 2003-312536 A | 11/2003 |
| JP | 2004-509000 A | 3/2004 |
| JP | 2005-161938 A | 6/2005 |
| JP | 2006-151103 A | 6/2006 |
| JP | 2007-313963 A | 12/2007 |
| JP | 2009-12562 A | 1/2009 |
| JP | 2009-516617 A | 4/2009 |
| JP | 2011-111081 A | 6/2011 |
| JP | 2012-131334 A | 7/2012 |
| JP | 2013-112075 A | 6/2013 |

OTHER PUBLICATIONS

International Search Report dated Nov. 12, 2013 in PCT/JP2013/076437.
Written Opinion of the IPEA dated Mar. 31, 2015 in PCT/JP2013/076437.

* cited by examiner

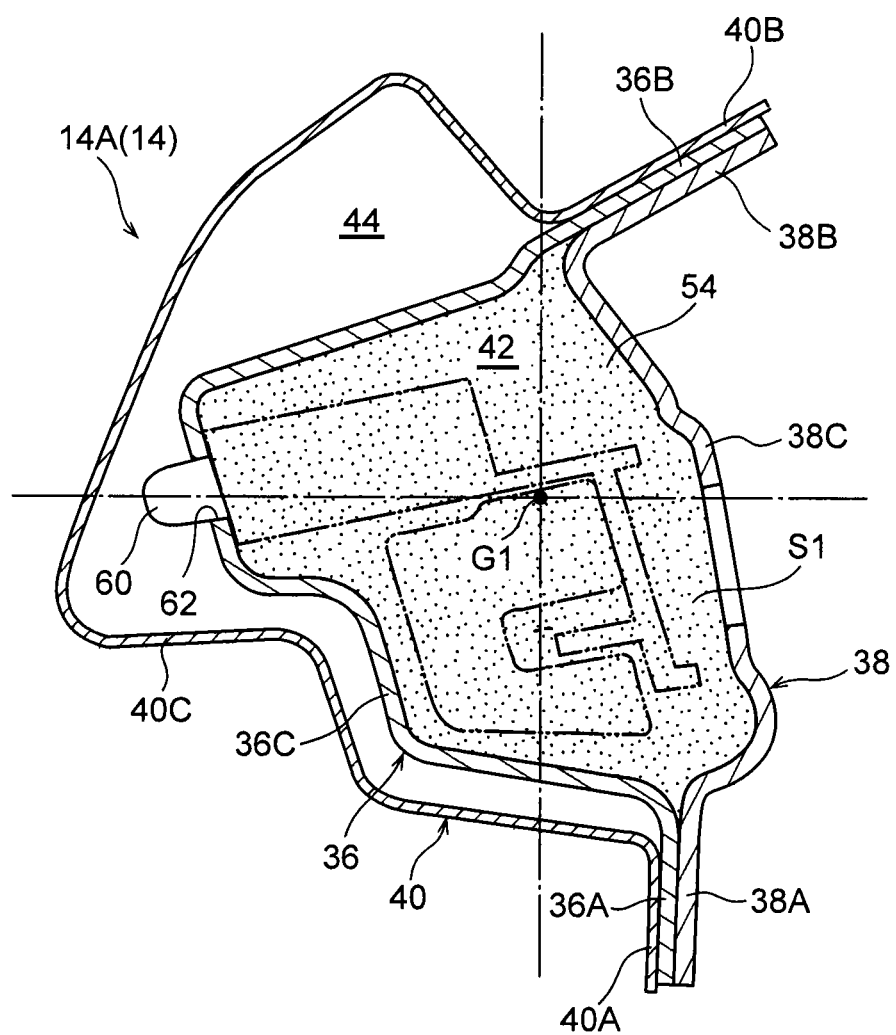

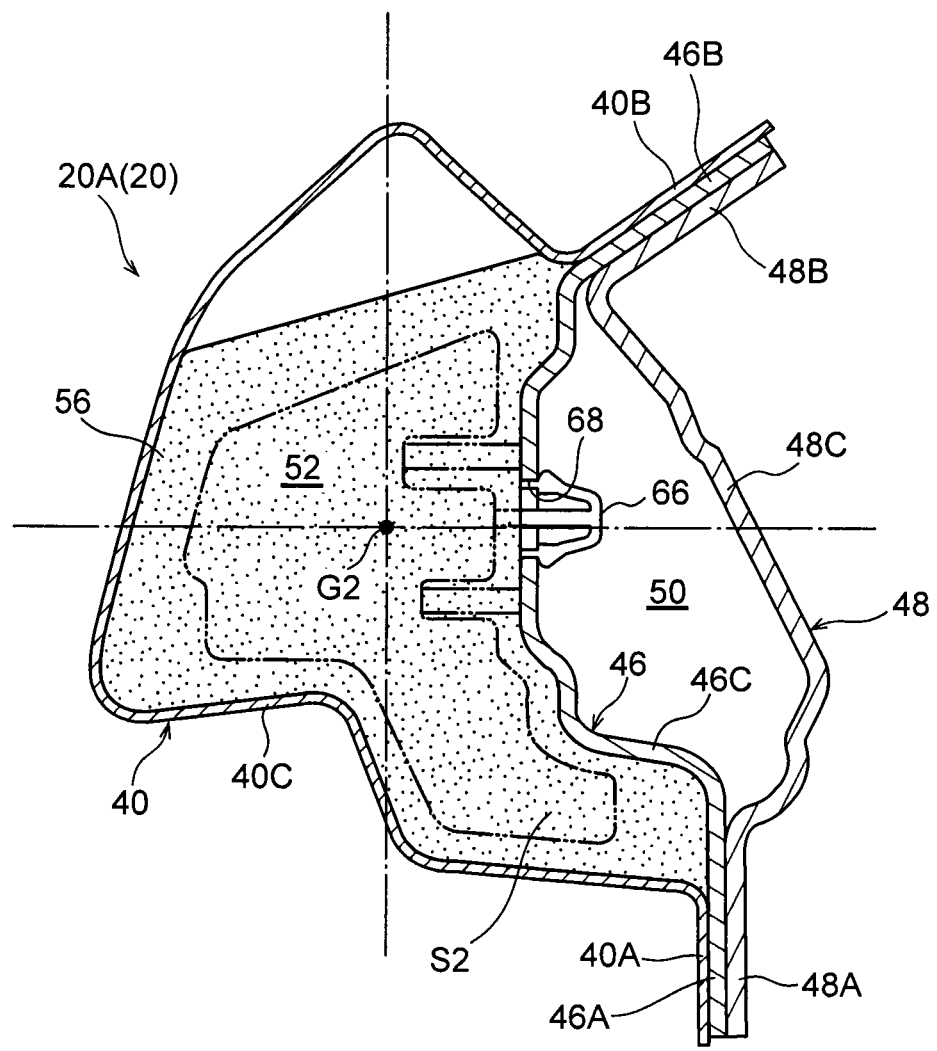

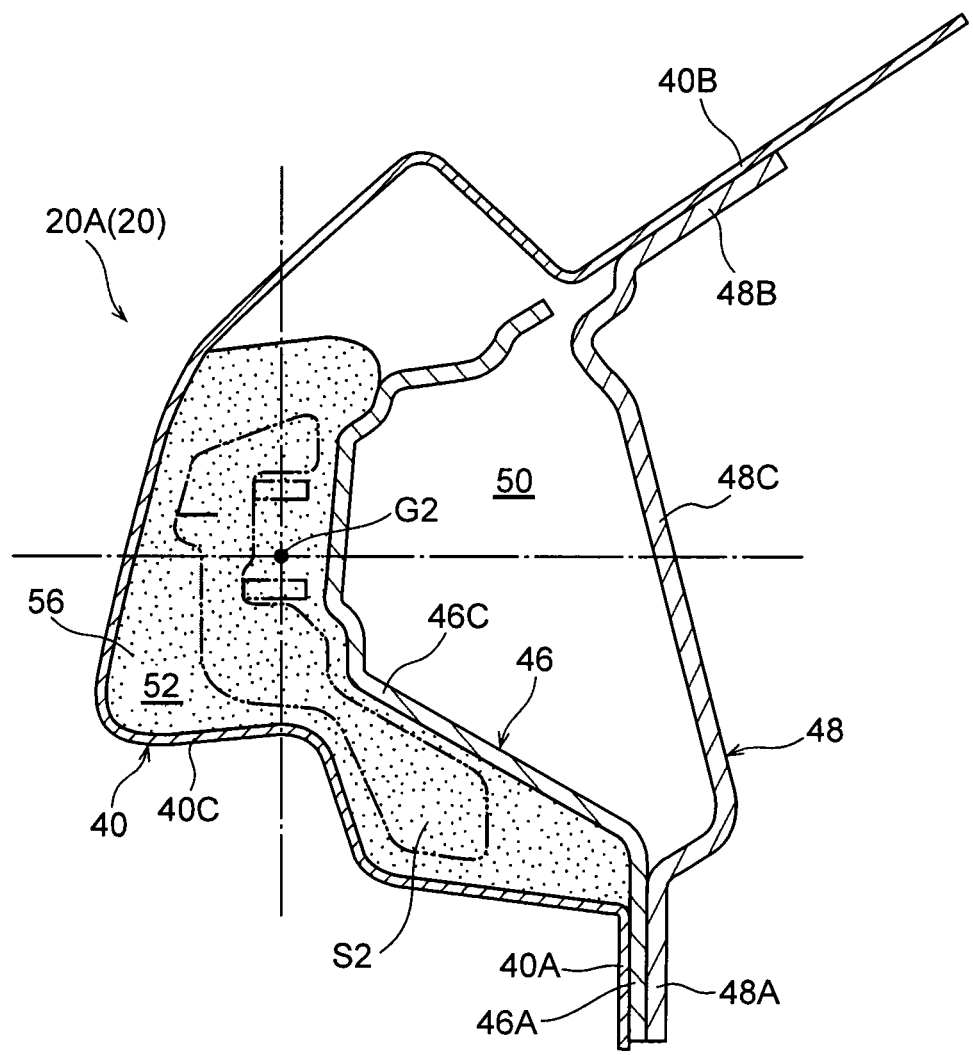

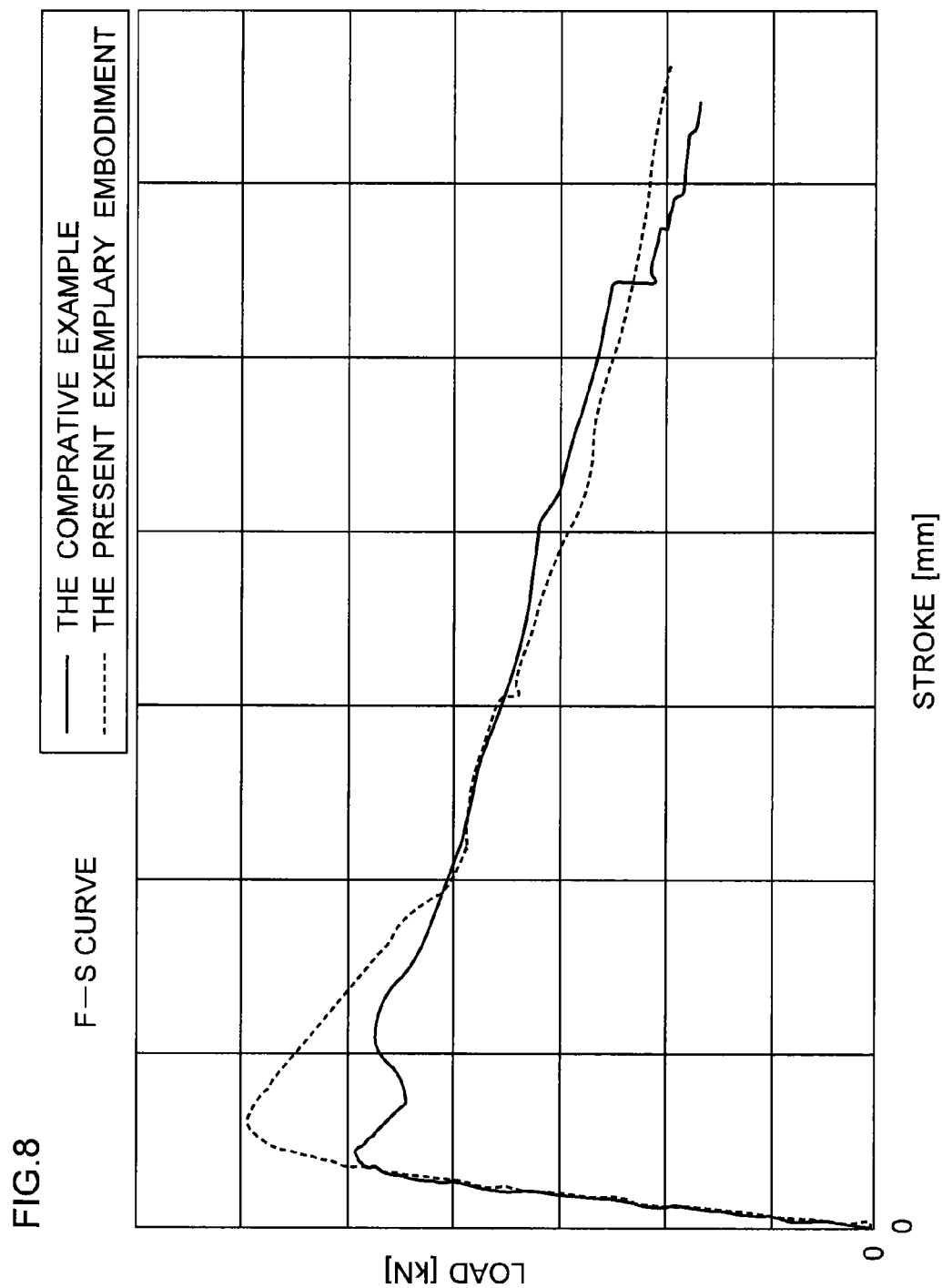

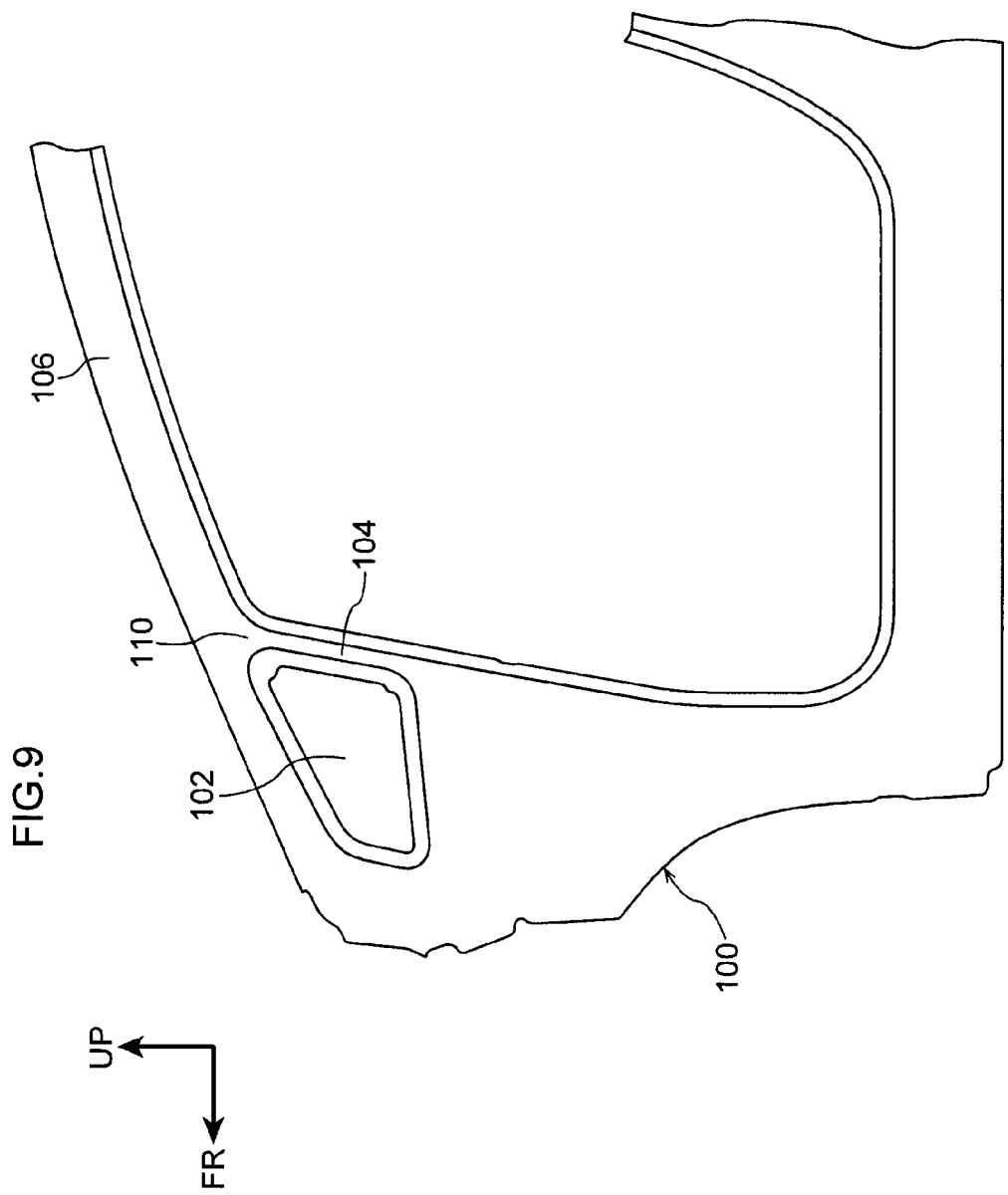

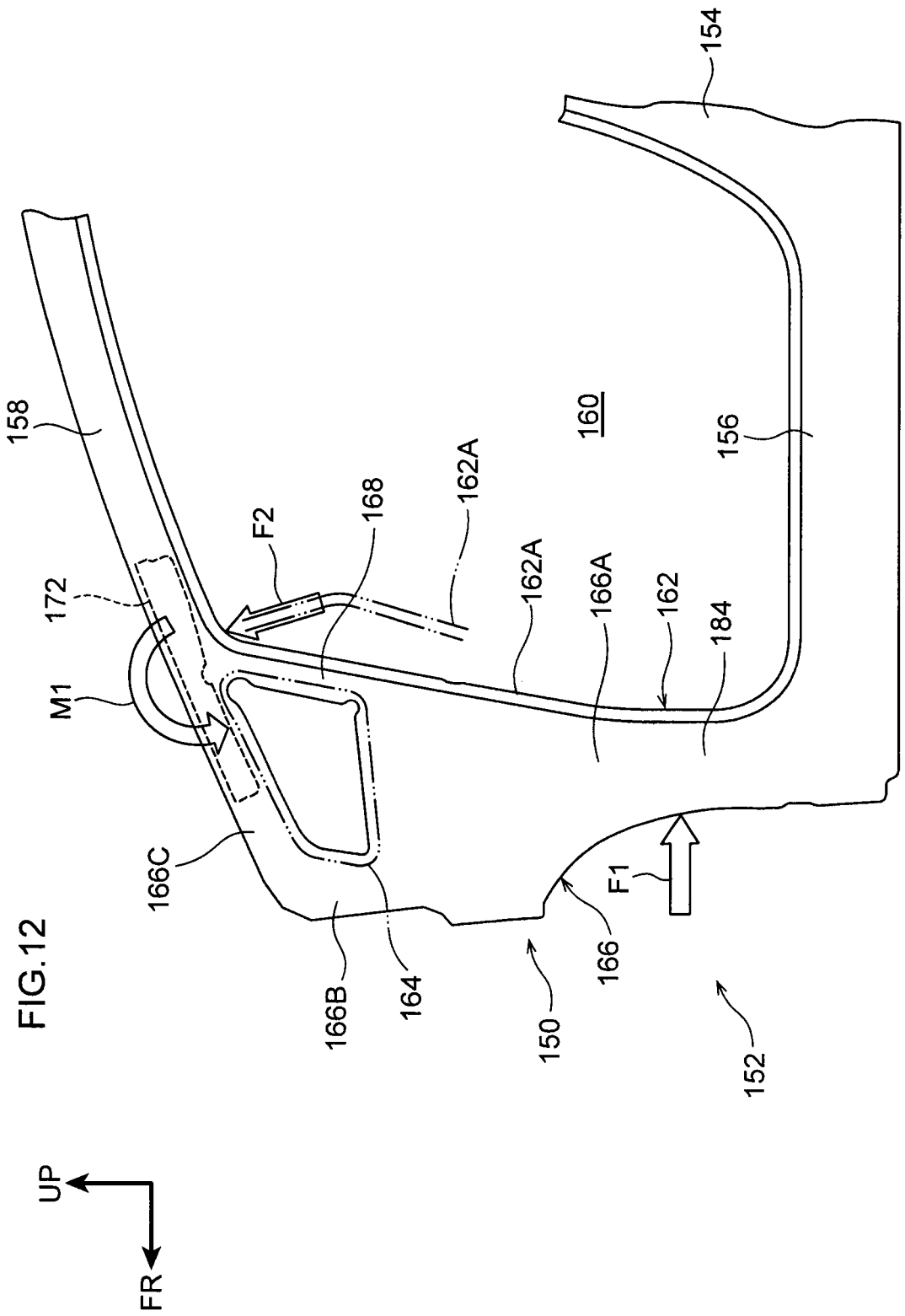

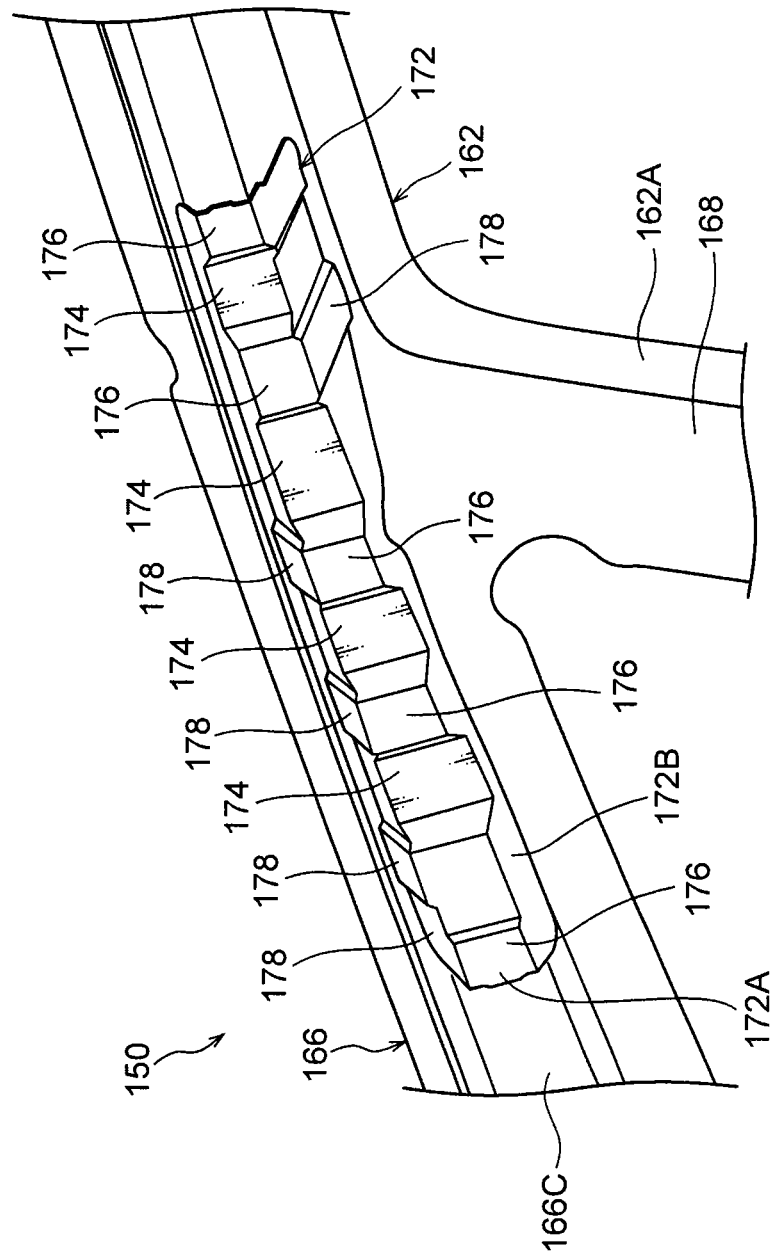

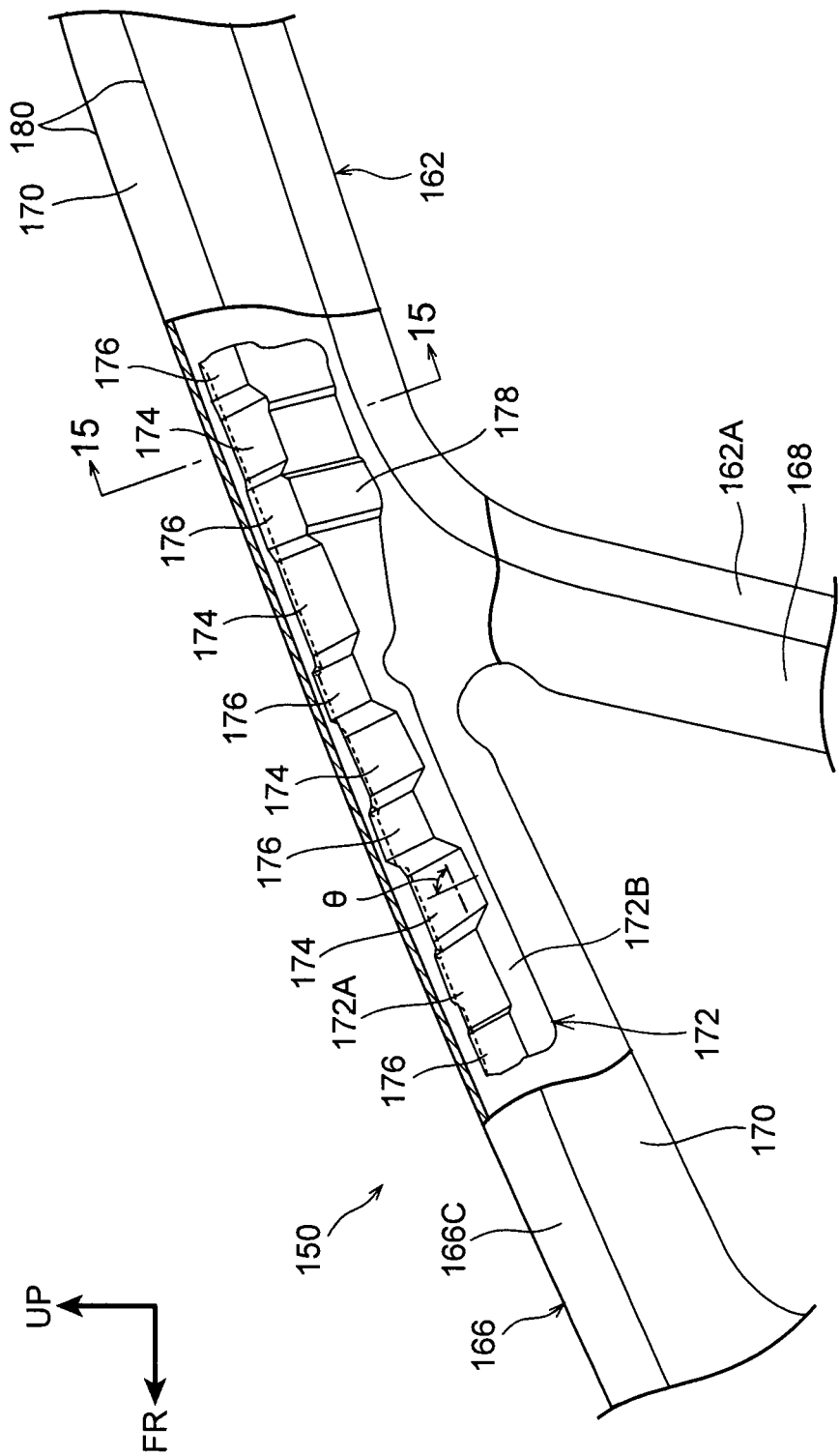

VEHICLE BODY STRUCTURE

TECHNICAL FIELD

The present invention relates to a vehicle body structure.

BACKGROUND ART

Patent Document 1 below describes a relationship of a cross-section structure of a roof side rail portion to a curtain airbag device. As in Cited Document 1, roof side rail portions are generally configured with a closed cross-section structure by a roof side rail inner panel and a roof side rail outer panel. A front end portion of the roof side rail configured with a closed cross-section structure is connected to a rear end portion of a front pillar, to form a vehicle body framework structure at a location spanning from an upper portion of the front pillar to the front portion of the roof side rail.

RELATED DOCUMENTS

Related Patent Documents

Patent Document 1: Japanese Patent Application Laid-Open (JP-A) No. 2002-220024

SUMMARY OF INVENTION

Technical Problem

Frontal collisions encompass various collision modes, including full overlap collisions, offset collisions, and oblique collisions. Recently, there is demand for measures against more violent collision modes, such as small overlap collisions, in which another vehicle collides further to the vehicle width direction outside than a front side member, and similar collisions. From this perspective, there is accordingly demand for further improvements to the vehicle body framework structure spanning from the upper portion of the front pillar to the roof side rail.

In consideration of the above circumstances, an object of the present invention is to obtain a vehicle body structure capable of suppressing or preventing folding partway along vehicle body framework with a hollow closed cross-section structure spanning from an upper portion of a front pillar to a front portion of a roof side rail in a frontal collision.

Solution to Problem

A vehicle body structure according to a first aspect includes: a roof side rail that is disposed along a vehicle front-rear direction at both vehicle width direction sides of a roof, and that is configured as a beam-shaped vehicle body framework member with a closed hollow cross-section structure including a third closed cross-section portion and a fourth closed cross-section portion by a roof side rail inner panel, a roof side rail outer panel, and a side outer panel; a resin first reinforcement member that, as viewed from the side of the vehicle, is disposed so as to contain a connection position, at a front portion of the roof side rail, to a front roof header disposed along an upper end portion of a windshield glass, and that is provided along a length direction of the front portion of the roof side rail so as to fill at least a portion of a space inside a closed hollow cross-section portion at the front portion of the roof side rail; front pillars that are disposed at both sides of a front section of a cabin, and that are configured as column-shaped vehicle body framework members with hollow closed cross-section structures including a first closed cross-section portion and a second closed cross-section portion by a front pillar inner panel, a front pillar outer panel, and a side door panel; and a resin second reinforcement member that is disposed containing a connection position between an upper portion of the front pillar and a front portion of the roof side rail, and that is provided so as to fill at least a portion of a space inside a hollow closed cross-section portion of the upper portion of the front pillar and the front portion of the roof side rail; wherein the first closed cross-section portion and the third closed cross-section portion are in mutual communication with each other, and the second closed cross-section portion and the fourth closed cross-section portion are in mutual communication with each other; the first reinforcement member is provided inside the fourth closed cross-section portion formed between the roof side rail outer panel and the side outer panel, the second reinforcement member is provided inside the first closed cross-section portion formed between the front pillar inner panel and the front pillar outer panel; and a continuous reinforcement member placement region is set by the first reinforcement member and the second reinforcement member in a range spanning from a base of the upper portion of the front pillar to the connection position at the front portion of the roof side rail to the front roof header.

A vehicle body structure according to a third aspect includes: a front pillar outer reinforcement that is disposed on a vehicle width direction outer side of a front pillar, and that is disposed along a vehicle front-rear direction along an extension line of a roof side rail;

an auxiliary pillar portion that configures a portion of the front pillar, that extends in a vehicle vertical direction along a rear end portion of a fixed window disposed at a vehicle lower side of the front pillar outer reinforcement, and that has a front pillar side portion of a door opening flange, which is disposed around a peripheral edge portion of a door opening section of a side door, formed at a vehicle rear side end portion thereof; and an elongated third reinforcement member that is disposed on the vehicle width direction inner side of the front pillar outer reinforcement so as to straddle the front pillar side portion of the door opening flange.

A vehicle body structure according to a fourth aspect is the third aspect, wherein: the front pillar outer reinforcement includes a plurality of ridge line portions that extend along a length direction of the front pillar outer reinforcement in a row in the vehicle width direction; and the third reinforcement member exhibits a reinforcing effect with respect to a vertical bending moment acting to vertically fold the plurality of ridge line portions in the vehicle vertical direction, and includes one, or two or more, rigidity tuning portions formed so as to act as folding origin points with respect to a horizontal bending moment acting to horizontally fold the plurality of ridge line portions in the vehicle width direction.

A vehicle body structure according to a fifth aspect is the fourth aspect, wherein the rigidity tuning portion is a recessed groove-shaped vertical bead formed orthogonally to the plurality of ridge line portions.

The first aspect achieves the following operation.

In general, in the event of a frontal collision, collision load is input to a front section of the vehicle body, before being transmitted through an upper portion of a front pillar to a front portion of a roof side rail. When this occurs, folding deformation (buckling) is liable to occur in cases in which the transmitted compression load is very large if a location is present where stress readily concentrates in vehicle body framework spanning from the upper portion of the front pillar to the front portion of the roof side rail.

Accordingly, in the present invention, as viewed from the side of the vehicle, the first reinforcement member is disposed so as to contain the connection position at the front portion of the roof side rail to the front roof header disposed along the upper end portion of the windshield glass. The first reinforcement member is configured from resin, and is provided along the length direction of the front portion of the roof side rail so as to fill at least a portion (the fourth closed cross-section portion formed between the roof side rail outer panel and the side outer panel) of the space inside the hollow closed cross-section portion including the third closed cross-section portion and the fourth closed cross-section portion at the front portion of the roof side rail. This thereby increases the rigidity of the connection portion at the front portion of the roof side rail to the front roof header. This thereby enables collision load (axial compression load) transmitted from the upper portion of the front pillar to the front portion of the roof side rail to be transmitted not only to the front portion of the roof side rail, but also the front roof header. Namely, collision load transmitted from a vehicle body front section to the framework of a cabin in a frontal collision can be transmitted from the upper portion of the front pillar on the collision side to the front portion of the roof side rail, and can also be dispersed and transmitted through the front roof header to the roof side rail on the opposite side to the collision side. This thereby enables a reduction in the load input to the joint between members at the connection location between the upper portion of the front pillar and the front portion of the roof side rail.

In the second aspect, the resin second reinforcement member is provided so as to fill at least a portion (a first closed cross-section portion formed between the front pillar inner panel and the front pillar outer panel) of the space inside the hollow closed cross-section portion including the first closed cross-section portion and the second closed cross-section portion of the upper portion of the front pillar and the front portion of the roof side rail, including at the connection position between the upper portion of the front pillar and the front portion of the roof side rail. The first reinforcement member and the second reinforcement member accordingly set the continuous reinforcement member placement region in the range spanning from the base of the upper portion of the front pillar to the connection position at the front portion of the roof side rail to the front roof header. Namely, a region with an increased actual area of a member capable of transmitting collision load is present continuously and uninterrupted along the vehicle front-rear direction. Accordingly, in the present invention, the reinforcement members are disposed continuously at a location spanning from the upper portion of the front pillar to the front portion of the roof side rail so as to straddle two points to the front and rear of each other that configure connection positions between members (the connection position between the upper portion of the front pillar and the front portion of the roof side rail, and the connection position between the front portion of the roof side rail and the front roof header).

The third aspect achieves the following operation.

In the third aspect, the front pillar includes the fixed window and the auxiliary pillar portion. More specifically, the front pillar outer reinforcement disposed along the vehicle front-rear direction on an extension line of the roof side rail is disposed on the vehicle width direction outside of the front pillar, and the fixed window is disposed at the vehicle lower side of the front pillar outer reinforcement. Moreover, the auxiliary pillar portion extends in the vehicle up-down direction along the rear end portion of the fixed window. The front pillar side portion of the door opening flange is formed at the vehicle rear side end portion of the auxiliary pillar portion.

Accordingly, in the event that a vehicle including the front pillar structure is involved in a frontal collision, and in particular a small overlap collision, the wheel-body of a front wheel presses the front pillar toward the vehicle rear side under collision load. Accordingly, a lower portion side of the front pillar (a portion facing the wheel in the vehicle front-rear direction) undergoes folding deformation, and collision load that is not completely absorbed travels through the front pillar side portion of the door opening flange and pushes up a location spanning from the upper portion of the front pillar to the roof side rail toward the vehicle upper side. As a result, a vertical bending moment arises at a location of the front pillar outer reinforcement where the auxiliary pillar portion and the roof side rail intersect. It is conceivable that the vertical bending moment could cause folding deformation of the location spanning from the upper portion of the front pillar to the roof side rail.

However, in the present aspect, the elongated third reinforcement member on the vehicle width direction inside of the front pillar outer reinforcement is disposed so as to straddle the front pillar side portion of the door opening flange, thereby obtaining a force to resist the vertical bending moment described above. The location spanning from the upper portion of the front pillar to the roof side rail accordingly does not fold readily.

In the fourth aspect, the front pillar outer reinforcement includes the plural ridge line portions that extend along the length direction of the front pillar outer reinforcement in a row in the vehicle width direction. The third reinforcement member exhibits a reinforcing effect with respect to a vertical bending moment acting to vertically fold the plural ridge line portions of the front pillar outer reinforcement in the vehicle up-down direction, and includes the one, or two or more, rigidity tuning portions formed so as to act as folding origin points with respect to a horizontal bending moment acting to horizontally fold the plural ridge line portions in the vehicle width direction. The front pillar outer reinforcement accordingly amply resists the vertical bending moment that acts in a collision such as a small overlap collision, suppressing folding deformation, and at the same time undergoes folding deformation toward the vehicle width direction outside, absorbing a portion of the collision energy. The amount by which the front pillar retreats is accordingly suppressed.

In the fifth aspect, the rigidity tuning portion is a recessed groove-shaped vertical bead. This thereby enables easy modification of the rigidity using, for example, the width and depth of the bead.

Advantageous Effects of Invention

As described above, the vehicle body structure according to the first aspect claim 1 of the present invention exhibits the excellent advantageous effect of enabling folding partway along vehicle body framework with a hollow closed cross-section structure spanning from the upper portion of the front pillar to the front portion of the roof side rail to be suppressed or prevented in a frontal collision.

The vehicle body structure according to the first aspect of the present invention exhibits the excellent advantageous effect of enabling folding partway along vehicle body framework with a hollow closed cross-section structure spanning from the upper portion of the front pillar to the front portion of the roof side rail to be very effectively suppressed or prevented in a frontal collision.

The vehicle body structure according to the third aspect exhibits the excellent advantageous effect of enabling folding partway along vehicle body framework with a hollow closed cross-section structure spanning from the upper portion of the front pillar to the front portion of the roof side rail to be suppressed or prevented in a frontal collision.

The vehicle body structure according to the fourth aspect exhibits the excellent advantageous effect of enabling folding deformation caused by a vertical bending moment to be effectively suppressed, and of enabling folding deformation caused by a horizontal bending moment to be promoted.

The vehicle body structure according to the fifth aspect exhibits the excellent advantageous effect of enabling easy tuning of the balance between vertical folding and horizontal folding.

BRIEF DESCRIPTION OF DRAWINGS

FIG. 4 is a vertical cross-section taken along line 4-4 in FIG. 1.

FIG. 5 is a vertical cross-section taken along line 5-5 in FIG. 1.

FIG. 6 is a vertical cross-section taken along line 6-6 in FIG. 1.

FIG. 8 is a force-strain curve for a vehicle applied with a vehicle body structure according to the first exemplary embodiment, and a vehicle applied with a vehicle body structure according to a comparative example, in a frontal collision.

FIG. 9 is a schematic side view of a vehicle body focusing on a front pillar, illustrating relevant portions of a vehicle body structure according to another exemplary embodiment.

FIG. 12 is a side view illustrating a vehicle body side section of a vehicle body structure according to a second exemplary embodiment.

FIG. 13 is a perspective view that is close to being a side view, focusing on a reinforcement member that is a relevant portion of the vehicle body structure illustrated in FIG. 12.

FIG. 14 is a side view focusing on a reinforcement member that is a relevant portion of the vehicle body structure illustrated in FIG. 12.

DESCRIPTION OF EMBODIMENTS

First Exemplary Embodiment

Figure 1:
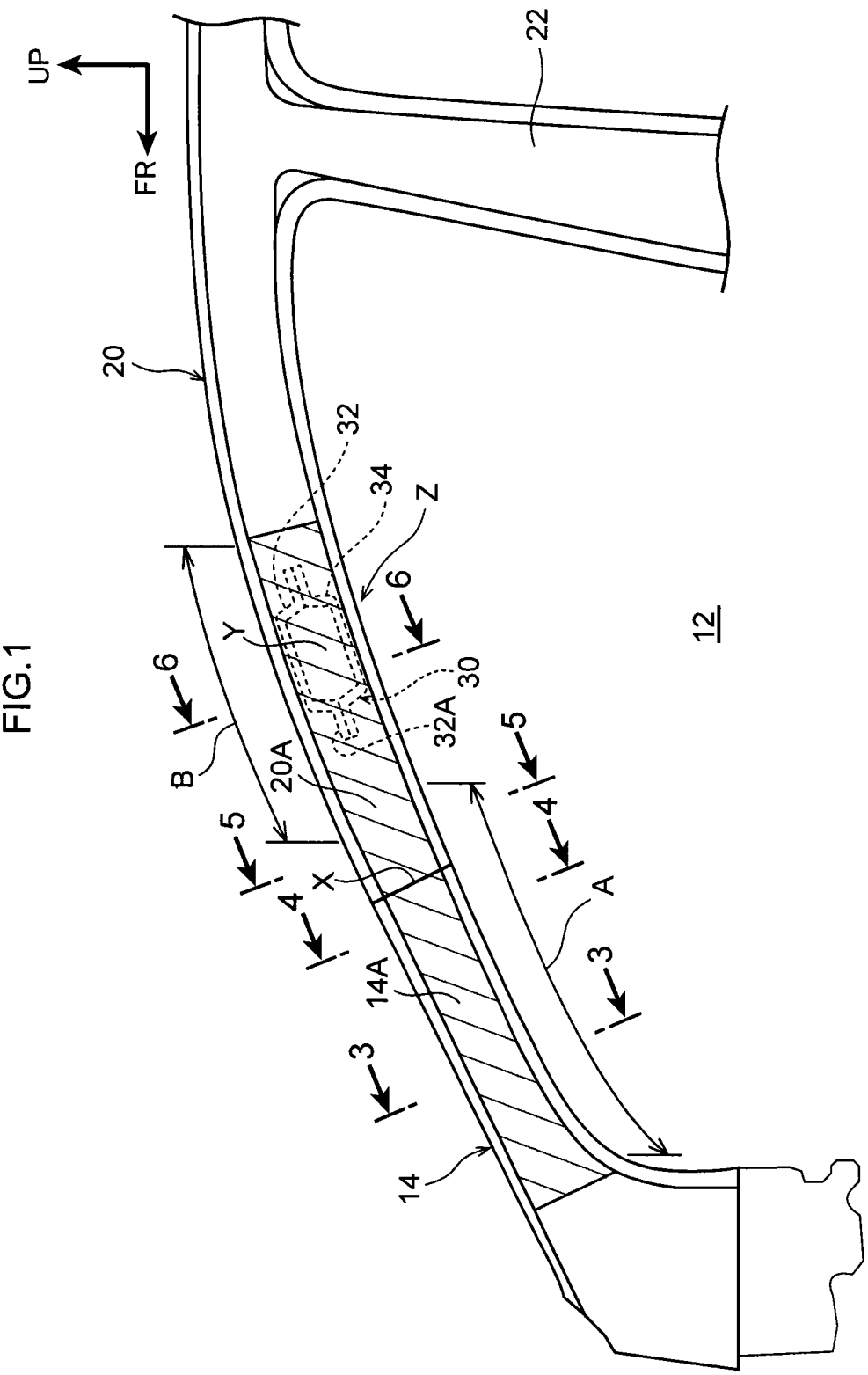
FIG. 1 is an enlarged partial side view to explain relevant portions of a vehicle body structure according to a first exemplary embodiment.

Explanation follows regarding a first exemplary embodiment of a vehicle body structure according to the present invention, with reference to FIG. 1 to FIG. 8. In the drawings, the arrow FR indicates the vehicle front side, the arrow UP indicates the vehicle upper side, and the arrow IN indicates the vehicle width direction inside, as appropriate.

Figure 2:
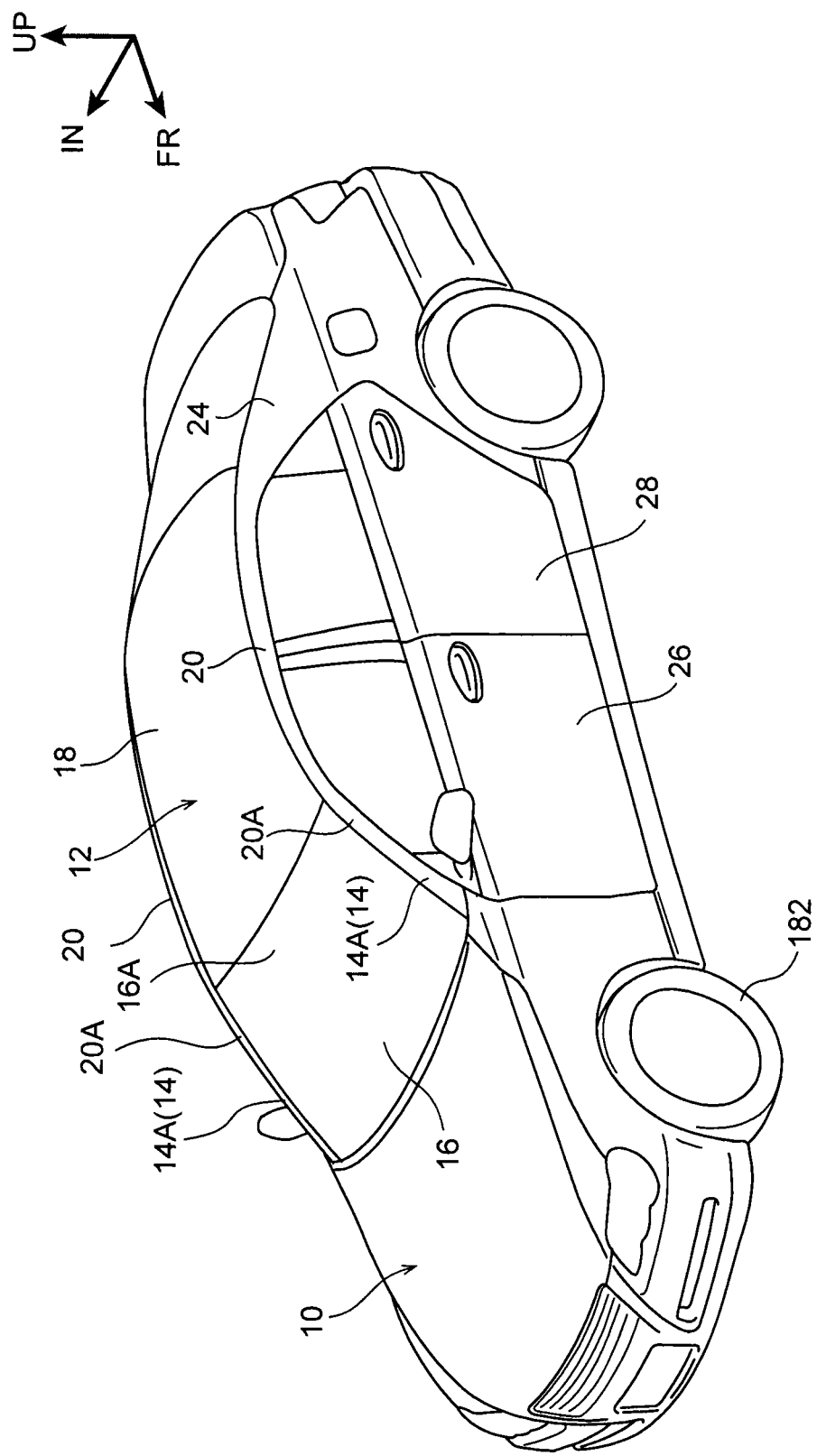
FIG. 2 is an external perspective view of a vehicle applied with a vehicle body structure according to the first exemplary embodiment.

FIG. 2 is a perspective view illustrating an external view of a vehicle applied with the vehicle body structure according to the present invention. As illustrated in FIG. 2, the vehicle is configured including a vehicle front section 10 that houses an engine or the like, not illustrated in the drawings, and a cabin 12 disposed at a vehicle rear side of the vehicle front section 10. An engine room and the cabin 12 are separated by a dash panel, not illustrated in the drawings. A pair of left and right front pillars 14, each configured as a column-shaped framework member of the vehicle body, project up on both vehicle width direction sides of the dash panel. An upper portion 14A of each front pillar 14 is inclined gently toward the vehicle rear side, and windshield glass 16 is installed between the upper portions 14A of the front pillars 14.

A roof panel 18, serving as a roof, is installed at an upper portion of the cabin 12. A pair of left and right roof side rails 20, each configured as a beam-shaped framework member of the vehicle body with a hollow closed cross-section structure, are installed on both vehicle width direction sides of the roof panel 18. The upper portions 14A of the front pillars 14 mentioned above are connected contiguously to front portions 20A of the roof side rails 20. Center pillars 22 (see FIG. 1) and rear pillars 24 are disposed in that sequence at the vehicle rear side of the respective front pillars 14. Upper end portions of the center pillars 22 and upper end portions of the rear pillars 24 are respectively joined to the roof side rails 20. Openable and closable front side doors 26 are provided between the respective front pillars 14 and center pillars 22, and openable and closable rear side doors 28 are provided between the respective center pillars 22 and rear pillars 24.

A front roof header 30 (see FIG. 1) with its length direction along the vehicle width direction is disposed at a back face side of a front end portion of the roof panel 18 mentioned above. The front roof header 30 is configured with a closed cross-section structure by a roof header upper panel 32 and a roof header lower panel 34, each configured with a hat shaped cross-section profile. Both length direction end portions of the front roof header 30 are joined by welding to the left and right roof side rails 20. An upper end portion 16A of the windshield glass 16 mentioned above is supported on a front side flange 32A of the roof header upper panel 32. Note that the structure of the front roof header 30 is not limited to the above, and other structures may be employed.

Next, explanation follows regarding the cross-section structure of the upper portion 14A of the front pillar 14, and the cross-section structure of the roof side rail 20 mentioned above, with reference to FIG. 3 to FIG. 6.

Figure 3:
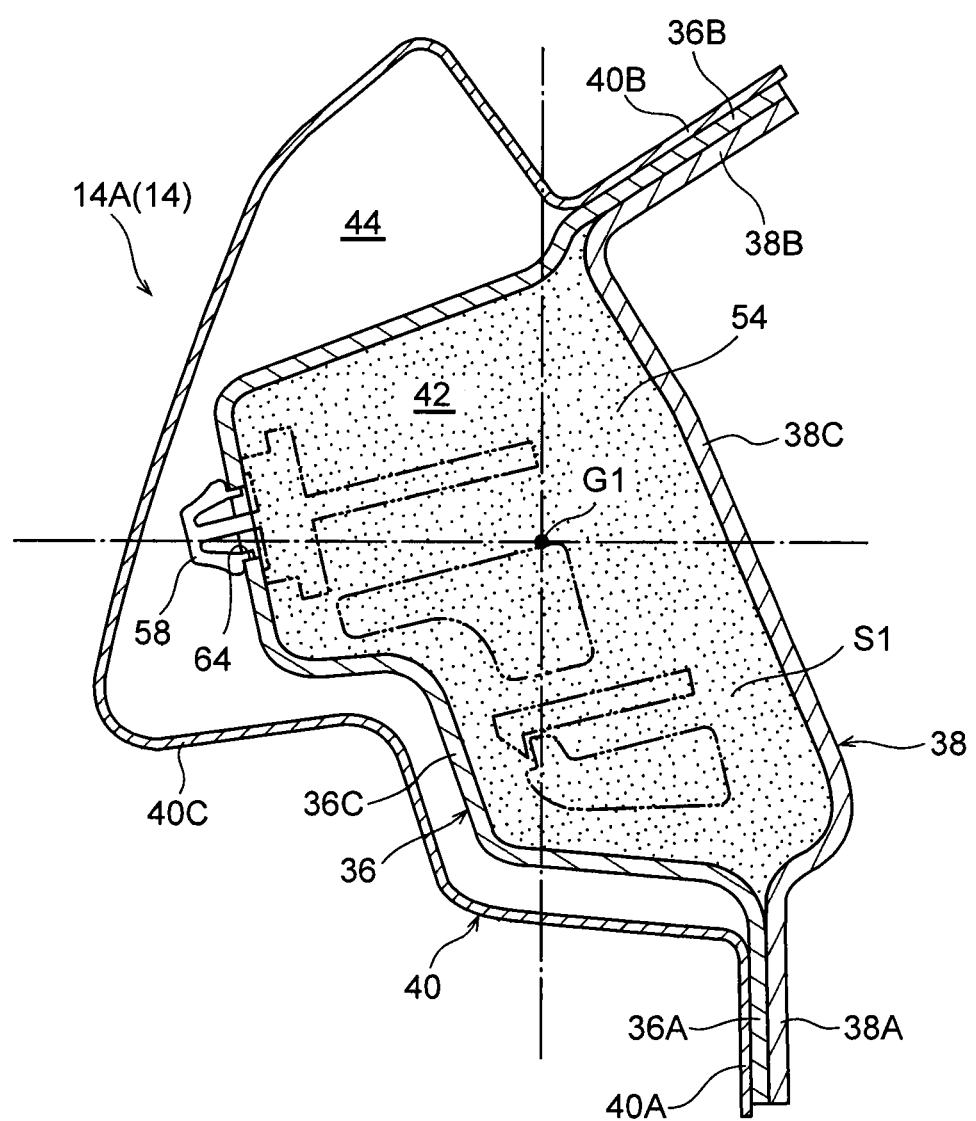
FIG. 3 is a vertical cross-section taken along line 3-3 in FIG. 1.

FIG. 3 and FIG. 4 illustrate a vertical cross-section structure of the upper portion 14A of the front pillar 14. As illustrated in FIG. 3 and FIG. 4, the front pillar 14 is configured by a front pillar outer panel 36 disposed on the outside of the vehicle cabin, a front pillar inner panel 38 disposed on the vehicle width direction inside of the front pillar outer panel 36, and a side outer panel 40 disposed on the vehicle width direction outside of the front pillar outer panel 36 and configuring an outer panel of the vehicle.

More specifically, the front pillar outer panel 36 includes a lower flange 36A extending out toward the vehicle lower side, an upper flange 36B extending out toward the vehicle width direction inside, and a main body 36C disposed between the lower flange 36A and the upper flange 36B and projecting out toward the vehicle width direction outside. Overall, the front pillar outer panel 36 is formed substantially in a hat shape opening toward the vehicle width direction inside. The front pillar inner panel 38 includes a lower flange 38A that is superimposed on the lower flange 36A of the front pillar outer panel 36, an upper flange 38B that is superimposed on the upper flange 36B of the front pillar outer panel 36, and a main body 38C that is disposed between the lower flange 38A and the upper flange 38B and that covers an open portion of the main body 36C of the front pillar outer panel 36. Overall, the front pillar inner panel 38 is formed substantially in a shallow-bottomed hat shape with a slight bulge toward the vehicle width direction inside. Moreover, the side outer panel 40 includes a lower flange 40A, an upper flange 40B, and a main body 40C that follow the cross-section profile of the front pillar outer panel 36, and is formed substantially in a hat shape opening toward the vehicle width direction inside.

The three members of the lower flange 36A of the front pillar outer panel 36, the lower flange 38A of the front pillar inner panel 38, and the lower flange 40A of the side outer panel 40 described above are joined together by spot welding in a superimposed state. Similarly, the three members of the upper flange 36B of the front pillar outer panel 36, the upper flange 38B of the front pillar inner panel 38, and the upper flange 40B of the side outer panel 40 are joined together by spot welding in a superimposed state. A first closed cross-section portion 42 is thereby formed between the main body 36C of the front pillar outer panel 36 and the main body 38C of the front pillar inner panel 38. A second closed cross-section portion 44 is formed between the main body 36B of the front pillar outer panel 36 and the main body 40C of the side outer panel 40.

FIG. 5 and FIG. 6 illustrate a vertical cross-section structure of the front portion 20A of the roof side rail 20. As illustrated in FIG. 5 and FIG. 6, the roof side rail 20 is configured by a roof side rail outer panel 46 disposed on the vehicle cabin outside, a roof side rail inner panel 48 disposed on the vehicle cabin width direction inside of the roof side rail outer panel 46, and the side outer panel 40 configuring a vehicle outer panel disposed on the vehicle width direction outside of the roof side rail outer panel 46. Note that the side outer panel 40 illustrated in FIG. 5 and FIG. 6 is the same member as the side outer panel 40 illustrated in FIG. 3 and FIG. 4, and so further explanation of the side outer panel 40 is omitted.

The roof side rail outer panel 46 includes a lower flange 46A extending out toward the vehicle lower side, an upper flange 46B extending out toward the vehicle width direction inside and the oblique upper side, and a main body 46C disposed between the lower flange 46A and the upper flange 46B and connecting the two together in an L-shape. The overall roof side rail outer panel 46 is formed substantially in a hat shape opening toward the vehicle width direction inside. The roof side rail inner panel 48 includes a lower flange 48A that is superimposed on the lower flange 46A of the roof side rail outer panel 46, an upper flange 48B that is superimposed on the upper flange 46B of the roof side rail outer panel 46, and a main body 48C that is disposed between the lower flange 48A and the upper flange 48B, and that covers an open portion of the main body 46C of the roof side rail outer panel 46. The overall roof side rail inner panel 48 is formed substantially in a shallow-bottomed hat shape with a slight bulge toward the vehicle width direction inside. The three members of the lower flange 46A of the roof side rail outer panel 46, the lower flange 46A of the roof side rail inner panel 48, and the lower flange 40A of the side outer panel 40 are joined together by spot welding in a superimposed state.

The three members of the upper flange 46B of the roof side rail outer panel 46, the upper flange 46B of the roof side rail inner panel 48, and the upper flange 40B of the side outer panel 40 are joined together by spot welding in a superimposed state. A third closed cross-section portion 50 is formed between the main body 46C of the roof side rail outer panel 46 and the main body 48C of the roof side rail inner panel 48. A fourth closed cross-section portion is formed between the main body 46C of the roof side rail outer panel 46 and the main body 40C of the side outer panel 40. The third closed cross-section portion 50 is in mutual communication with the first closed cross-section portion 42, and the fourth closed cross-section portion 52 is in mutual communication with the second closed cross-section portion 44.

A front side reinforcement member 54, serving as a second reinforcement member, is disposed inside the first closed cross-section portion 42 of the upper portion 14A of the front pillar 14 described above. A rear side reinforcement member 56, serving as a first reinforcement member, is disposed inside the fourth closed cross-section portion 52 of the front portion 20A of the roof side rail 20. Detailed explanation follows regarding the front side reinforcement member 54 and the rear side reinforcement member 56.

The front side reinforcement member 54 and the rear side reinforcement member 56 are each formed from a high rigidity urethane based foamed member. In a state prior to foaming, the front side reinforcement member 54 and the rear side reinforcement member 56 have long, thin block shapes running along the vehicle front-rear direction, as illustrated by the double-dotted intermittent lines in FIG. 3 to FIG. 6.

As illustrated in FIG. 3 and FIG. 4, a clip 58 and a positioning pin 60 are integrally formed to one side face (a vehicle width direction outside face) of the front side reinforcement member 54. The positioning pin 60 is inserted into a positioning hole 62, and the clip 58 is pushed into an attachment hole 64 formed in a bottom portion of the main body 36C of the front pillar outer panel 36 from the vehicle cabin inside, thereby mounting the front side reinforcement member 54 to the main body 36C of the front pillar outer panel 36. Painting is performed in this state, and after drying, the front side reinforcement member 54 is foamed so as to fill the entire space inside the first closed cross-section portion 42, and hardens in this state. The front side reinforcement member 54 is accordingly fixed to the respective wall faces configuring the first closed cross-section portion 42, and the first closed cross-section portion 42 becomes a solid member, increasing the rigidity of the upper portion 14A of the front pillar 14. Note that a front end portion of the rear side reinforcement member 56 and a rear end portion of the front side reinforcement member 54 are coupled together by a joint mechanism, not illustrated in the drawings. The rear side reinforcement member 56 and the front side reinforcement member 54 thereby form an integral state after hardening.

With respect to the centroid G1 of the first closed cross-section portion 42, the front side reinforcement member 54 fills a region S1 on at least the vehicle width direction inside and the vehicle lower side at a location that is subject to compression by collision load in a frontal collision. Note that although the position of the centroid G1 is somewhat displaced since the first closed cross-section portion 42 as illustrated in FIG. 3, and the first closed cross-section portion 42 as illustrated in FIG. 4 are slightly different in shape, the same reference numeral G1 is used.

As illustrated in FIG. 5 and FIG. 6, one side face (the vehicle width direction inside face) of the rear side reinforcement member 56 is integrally formed with a clip 66, and a positioning pin, not illustrated in the drawings. The positioning pin is inserted into a positioning hole, and the clip 66 is pushed into an attachment hole 68 formed in a bottom portion of the main body 46C of the roof side rail outer panel 46 from the vehicle cabin outside, thereby mounting the rear side reinforcement member 56 to the main body 46C of the roof side rail outer panel 46. Painting is performed in this state, and after drying, the rear side reinforcement member 56 is foamed to fill the entire space inside the fourth closed cross-section portion 52, and hardened in this state. The rear side reinforcement member 56 is accordingly fixed to the respective wall faces configuring the fourth closed cross-section portion 52, and the fourth closed cross-section portion 52 becomes a substantially solid member, increasing the rigidity of the front portion 20A of the roof side rail 20.

At the roof side rail 20 side, the rear side reinforcement member 56 is not provided on the side of the third closed cross-section portion 50, unlike at the front pillar 14 side. Since the third closed cross-section portion 50 has a small area, space for disposing the rear side reinforcement member 56 configured with a clip attachment structure cannot be secured, and, even supposing the third closed cross-section portion 50 were to be filled with a rear side reinforcement member, since the third closed cross-section portion 50 has a small area, it is possible that reinforcement effect on a connection position X, described later, between the upper portion 14A of the front pillar 14 and the front portion 20A of the roof side rail 20 would be reduced.

With respect to the centroid G2 of the fourth closed cross-section portion 52, the rear side reinforcement member 56 fills a region S2 on at least the vehicle width direction inside and the vehicle lower side at a location that is subject to compression by collision load in a frontal collision. Note that although the position of the centroid G1 is somewhat displaced since the fourth closed cross-section portion 52 as illustrated in FIG. 5, and the fourth closed cross-section portion 52 as illustrated in FIG. 6 are slightly different in shape, the same reference numeral G2 is used.

As illustrated in FIG. 1, as viewed from the side of the vehicle, the front side reinforcement member 54 described above is set in a range labeled A, from the base of the upper portion 14A of the front pillar 14 and containing the connection position X between the upper portion 14A and the front portion 20A of the roof side rail 20. The rear side reinforcement member 56 is set in a range labeled B, from a position further to the vehicle rear side than the connection position X between the upper portion 14A of the front pillar 14 and the front portion 20A of the roof side rail 20 and containing a connection position Y between the front portion 20A of the roof side rail 20 and the front roof header 30 described above. The front side reinforcement member 54 and the rear side reinforcement member 56 are coupled by a joint, not illustrated in the drawings, in a state prior to foaming, and are integrated together after foaming and hardening, and so the range labeled B and the range labeled A are illustrated partially overlapping with each other. Due to the above configuration, a contiguous reinforcement member placement region Z (the region illustrated by diagonal hatching in FIG. 1) is set by the rear side reinforcement member 56 and the front side reinforcement member 54 in a range from the connection position X between the upper portion 14A of the front pillar 14 and the front portion 20A of the roof side rail 20, to the connection position Y between the front portion 20A of the roof side rail 20 and the front roof header 30.

Operation and Advantageous Effects of the Present Exemplary Embodiment

Figure 7A:
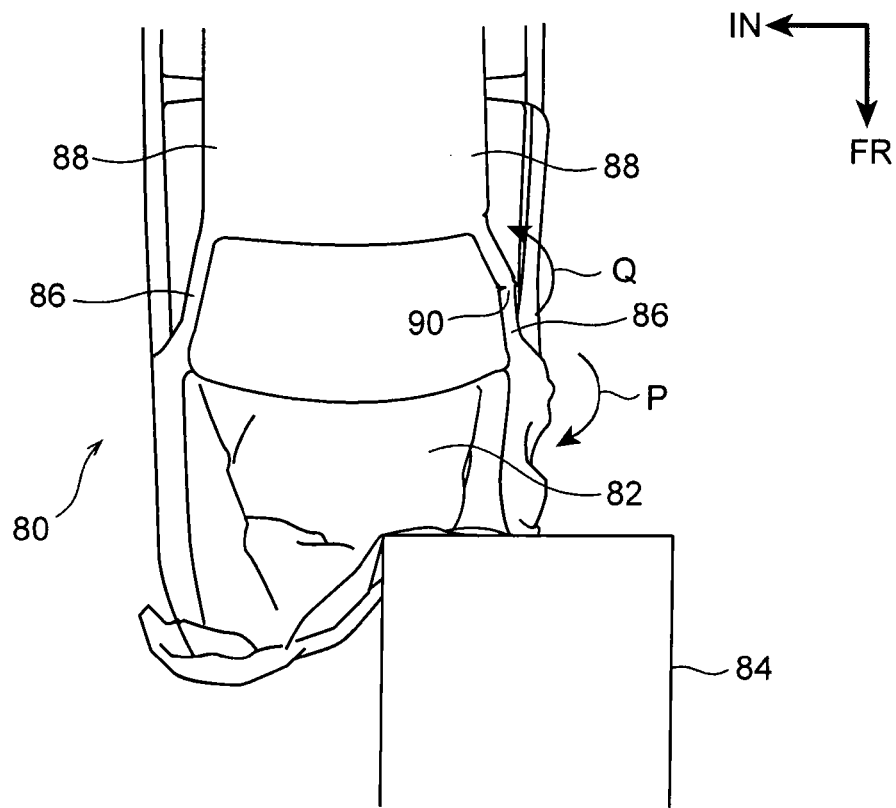
FIG. 7A is a schematic plan view illustrating a collision state of a vehicle according to a comparative example.
Figure 7B:
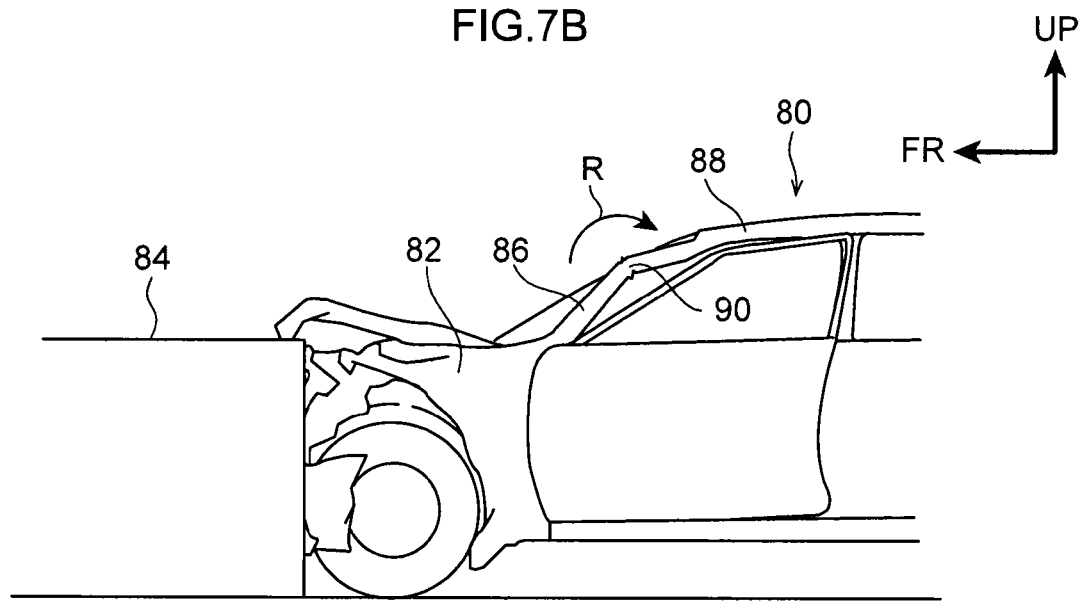
FIG. 7B is a schematic side view illustrating a collision state of a vehicle according to a comparative example.

Next, explanation follows regarding operation and advantageous effects of the present exemplary embodiment, with reference to FIG. 7A and FIG. 7B.

FIG. 7A schematically illustrates a state in which a vehicle 80 according to a comparative example that is not provided with the vehicle body structure according to the present exemplary embodiment is involved in a frontal collision with a barrier 84. As illustrated in FIG. 7A, when an input load (compression load) to a vehicle front section 82 is very large, such as in a small overlap collision or an oblique collision, a lower portion of a front pillar 86 contacts the barrier 84 before being twisted toward the vehicle width direction inside (see arrow P in FIG. 7A). Accordingly, a region spanning from the front pillar 86 to a roof side rail 88 undergoes bending deformation so as to protrude toward the vehicle width direction outside (see arrow Q in FIG. 7A). As viewed from the side of the vehicle, the region spanning from the front pillar 86 to the roof side rail 88 undergoes bending deformation so as to protrude toward the vehicle upper side (see arrow R in FIG. 71B). Accordingly, when a location 90 where stress readily concentrates is present in the vehicle body framework spanning between the front pillar 86 and the roof side rail 88, folding deformation (buckling) is liable to occur in cases in which a very large load is input to the vehicle front section 82.

In the present exemplary embodiment, as viewed from the side of the vehicle, the rear side reinforcement member 56 is disposed in the roof side rail 20 so as to contain the connection position Y with the front roof header 30 disposed along the upper end portion 16A of the windshield glass 16. The rear side reinforcement member 56 is configured from a high rigidity urethane based foamed member, and is provided along the length direction of the front portion 20A of the roof side rail 20 so as to fill substantially the entire space inside the hollow fourth closed cross-section portion 52 of the front portion 20A of the roof side rail 20. The rigidity of the connection position Y with the front roof header 30 at the front portion 20A of the roof side rail 20 is accordingly increased. This thereby enables collision load (axial compression load) transmitted from the front pillar 14 to the roof side rail 20 to be transmitted not only to the roof side rail 20, but also the front roof header 30. Namely, in a frontal collision, collision load transmitted from the vehicle front section 10 to the framework of the cabin 12 can be transmitted from the front pillar 14 to the roof side rail 20 on the collision side, and further dispersed and transmitted through the front roof header 30 to the roof side rail 20 on the opposite side to the collision side. This thereby enables a reduction in the load input to the joint between members at the connection location between the front pillar 14 and the roof side rail 20 (the location illustrated by the connection position X). As a result, providing the rear side reinforcement member 56 enables a portion spanning from the upper portion 14A of the front pillar 14 to the front portion 20A of the roof side rail 20 to be suppressed or prevented from undergoing folding deformation in the vicinity of the connection position X between the upper portion 14A and the front portion 20A.

FIG. 8 is a force-strain curve illustrating static compression of the vehicle body framework member spanning from the upper portion 14A of the front pillar 14 to the front portion 20A of the roof side rail 20. The solid line on the graph is a force-strain curve for the comparative example that is not provided with the front side reinforcement member 54 and the rear side reinforcement member 56, and the intermittent line on the graph is a force-strain curve for the present exemplary embodiment that is provided with the front side reinforcement member 54 and the rear side reinforcement member 56. Comparison of the two curves on the graph reveals that the present exemplary embodiment exhibits greater cross-section retention strength than the comparative example, with peak load with respect to stroke increased by approximately 20% at an initial stage.

The vehicle body structure according to the present exemplary embodiment accordingly enables folding partway along the vehicle body framework with a hollow closed cross-section structure spanning from the front pillar 14 to the roof side rail 20 to be suppressed or prevented in a frontal collision.

In the present exemplary embodiment, the front side reinforcement member 54 configured from a high rigidity urethane based foamed member is provided so as to fill at least a portion of the space inside the hollow closed cross-section portion at the upper portion of the front pillar 14 and the front portion 20A of the roof side rail 20, containing the connection position X between the upper portion 14A of the front pillar 14 and the front portion 20A of the roof side rail 20. The rear side reinforcement member 56 and the front side reinforcement member 54 accordingly set the contiguous reinforcement member placement region Z in the range spanning from the connection position X between the front pillar 14 and the roof side rail 20 to the connection position Y between the roof side rail 20 and the front roof header 30. Namely, a region with an increased actual area of a member capable of transmitting collision load is present continuously and uninterrupted along the vehicle front-rear direction. Accordingly, in the present exemplary embodiment, a reinforcement member (the front side reinforcement member 54 and the rear side reinforcement member 56) is disposed at a location spanning from the front pillar 14 to the roof side rail 20 so as to straddle continuously across two points to the front and rear of each other that respectively configure connection positions between members (the connection position X between the upper portion 14A of the front pillar 14 and the front portion 20A of the roof side rail 20, and the connection position Y between the front portion 20A of the roof side rail 20 and the front roof header 30). As a result, in a frontal collision, the present exemplary embodiment enables highly effective suppression or prevention of folding partway along the vehicle body framework with a hollow closed cross-section structure spanning from the front pillar 14 to the roof side rail 20.

Note that in the present exemplary embodiment, the front side reinforcement member 54 fills the entire space inside the first closed cross-section portion 42. However, there is no limitation thereto, and it is sufficient that the front side reinforcement member 54 fills at least the region S1. This concept similarly applies to the rear side reinforcement member 56 filling the space inside the fourth closed cross-section portion 52. The rear side reinforcement member 56 does not fill the entire space inside the fourth closed cross-section portion 52; however there is no limitation thereto, and the rear side reinforcement member may fill the entire space inside the fourth closed cross-section portion 52.

Figure 10:
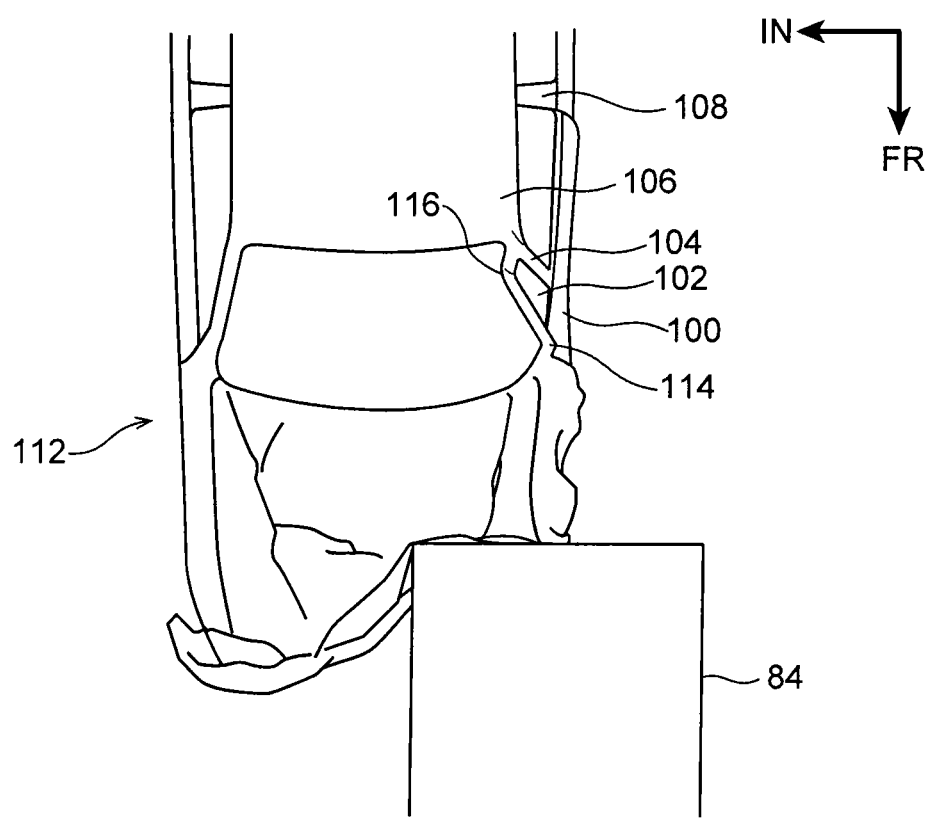
FIG. 10 is a schematic closed plan view illustrating a collision state of a vehicle provided with the front pillar illustrated in FIG. 9.

Explanation follows regarding other exemplary embodiments, with reference to FIG. 9 to FIG. 11. Note that configuration portions similar to those in the exemplary embodiment described above are allocated the same reference numerals, and explanation thereof is omitted.

In the vehicle body structure illustrated in FIG. 9, a fixed window 102 formed substantially in a triangular shape as viewed from the side is disposed at an upper portion of a front pillar 100. More specifically, the fixed window 102 has a trapezoidal shape disposed with its upper base on the vehicle front side and its lower base on the vehicle rear side, and the lower base formed longer than the upper base. A corresponding rear side support portion (A' pillar) 104 is disposed along the vehicle up-down direction at a rear edge side of the fixed window 102 at an upper portion of the front pillar 100. The rear side support portion 104 has a substantially rectangular shape in plan view cross-section, and configures framework with a closed cross-section structure. An upper end portion of the rear side support portion 104 is connected to a roof side rail 106. A fulcrum 110 is thereby newly formed between the front pillar 100 and a center pillar 108 (see FIG. 10).

Figure 11A:
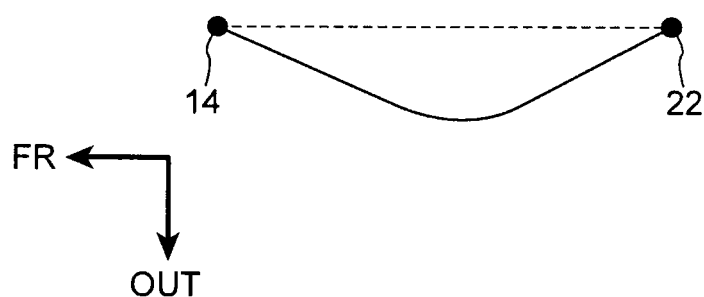
FIG. 11A is a schematic view graphically representing the bending deformation mode illustrated in FIG. 7A.
Figure 11B:
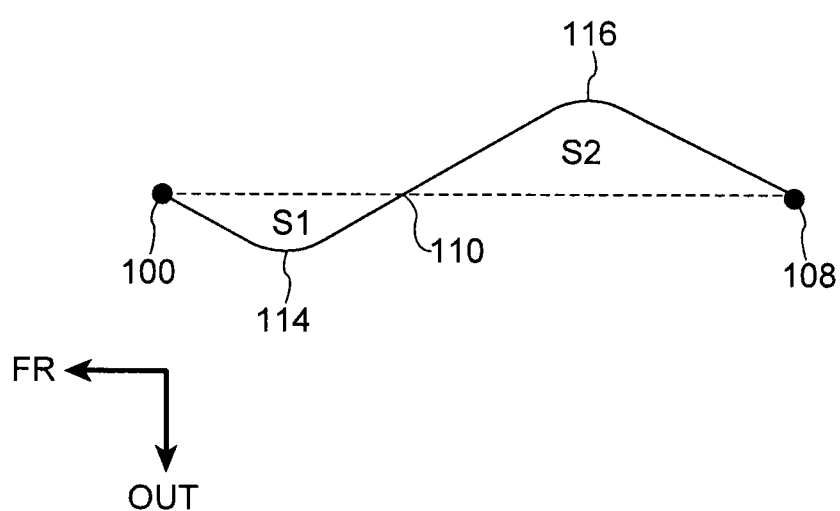
FIG. 11B is a schematic view graphically representing the bending deformation mode illustrated in FIG. 10.

FIG. 10 schematically illustrates a state in which a vehicle 112 provided with the front pillar 100 is involved in a frontal collision with the barrier 84. As illustrated in FIG. 10, in the vehicle body structure additionally provided with the fulcrum 110, when the vehicle 112 collides with the barrier 84, a portion spanning from an upper portion of the front pillar 100 to the roof side rail 106 bends substantially into a Z shape in plan view. Namely, a first bending portion 114, this being a location of bending toward the vehicle front side, undergoes bending deformation so as to protrude toward the vehicle width direction outside and the vehicle upper side, similarly to in the exemplary embodiment described above. However, a second bending portion 116 positioned further to the vehicle rear side than the first bending portion 114 undergoes bending deformation so as to protrude toward the vehicle width direction inside and the vehicle upper side, in the opposite direction to the first bending portion 114. FIG. 11A is a schematic diagram schematically illustrating the bending deformation mode in the exemplary embodiment described above, and FIG. 11B is a schematic diagram schematically illustrating a bending deformation mode for the front pillar 100 provided with the fixed window 102.

By changing the framework structure of the upper portion of the front pillar 100 in this manner, the placement positions of the front side reinforcement member 54 and the rear side reinforcement member 56 described above may be reversed in the vehicle width direction when switching the bending deformation mode of the portion spanning from the front pillar 100 to the roof side rail 106 in the vehicle width direction. Namely, in FIG. 11B, the bending deformation region S1 on the first bending portion 114 side matches the bending deformation mode in FIG. 11A. Since in the region S1, the side that is compressed is further to the vehicle width direction inside than the position of the centroid in the closed cross-section portion of this portion, the reinforcement member is disposed on at least the vehicle width direction inside. However, since the bending deformation region S2 on the second bending portion 116 side is phase-reversed with respect to the bending deformation mode illustrated in FIG. 11A, the side that is compressed is further to the vehicle width direction outside than the position of the centroid of the closed cross-section portion of this portion, and so the reinforcement member is disposed at least on the vehicle width direction outside.

Second Exemplary Embodiment

Explanation follows regarding a second exemplary embodiment of a vehicle body structure according to the present invention, with reference to FIG. 12 to FIG. 18.

FIG. 12 illustrates a vehicle body side section 152 including a front pillar 150 with the same structure as the front pillar 100 illustrated in FIG. 9 described above. As illustrated in FIG. 12, a door opening section 160 through which an occupant boards and alights is formed on a vehicle front-rear direction front side of the vehicle body side section 152, in a range enclosed by a center pillar 154, a front pillar 150, a rocker 156, and a roof side rail 158.

To further explain the body structure, the rockers 156 are beam-shaped vehicle body framework members with a closed cross-section structure, and extend along the vehicle front-rear direction at both vehicle width direction end portions of a vehicle body floor, not illustrated in the drawings. The roof side rails 158 are beam-shaped vehicle body framework members with closed cross-section structures, and extend along the vehicle front-rear direction at both vehicle width direction end portions of a roof panel, not illustrated in the drawings. Each center pillar 154 is a column-shaped vehicle body framework member provided projecting up at a length direction intermediate portion of the rocker 156, and is connected to the roof side rail 158. Each front pillar 150 is a column-shaped vehicle body framework member provided upright at a front end portion of the rocker 156, and is connected to a front end portion of the roof side rail 158. Moreover, the door opening section 160 described above is opened and closed by a side door 26 (illustrated in FIG. 2 of the first exemplary embodiment described above). A door opening flange 162, configured by aligning two or three flanges, is formed continuously around an inner peripheral edge portion of the door opening section 160. The front pillar 150 side of the door opening flange is referred to as the "front side opening flange 162A" (serving as a front pillar side portion). An elongated rubber opening weather strip, not illustrated in the drawings, is attached to the door opening flange 162.

The front pillar 150 is provided with a fixed window 164, in the manner described above. Accordingly, in the following explanation, a portion (portion A 166A) from a front end portion of the rocker 156 to a lower end portion of the fixed window 164, a portion (portion B 166B) extending in the vehicle up-down direction along a front end portion of the fixed window 164, and a portion (portion C 166C) extending in the vehicle front-rear direction along an upper end portion of the fixed window 164 (along the extension direction of the roof side rail 158) are collectively referred to as the "front pillar body 166", and a portion extending in the vehicle up-down direction along a rear end portion of the fixed window 164 is referred to as an "auxiliary pillar portion 168". A vehicle rear side end portion of the auxiliary pillar portion 168 is provided with the front side opening flange 162A described above.

Figure 15:
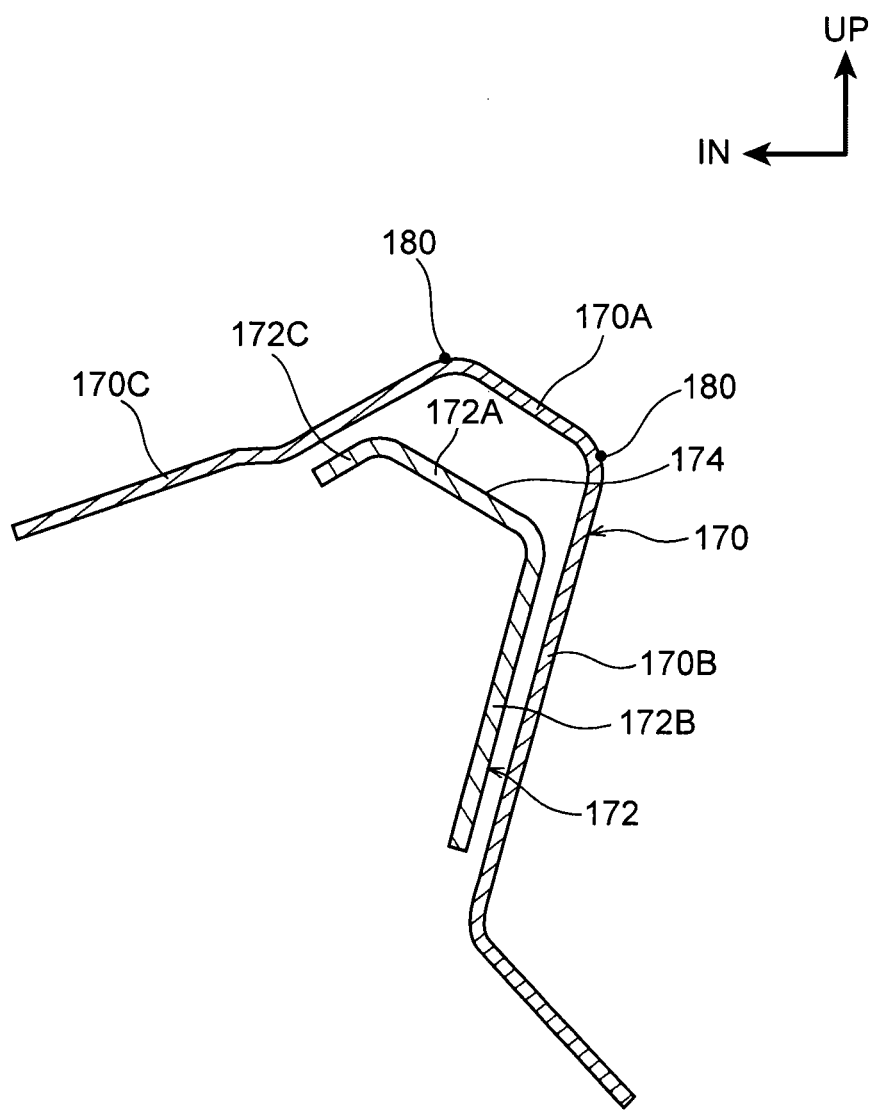
FIG. 15 is a vertical cross-section taken along line 15-15 in FIG. 13.

As illustrated in FIG. 15, etc., front pillar outer reinforcement 170 is provided to the vehicle width direction outside of the portion C 166C of the front pillar 150. The vertical cross-section profile of the front pillar outer reinforcement 170 (the cross-section profile as taken along a direction orthogonal to the length direction of the front pillar outer reinforcement 170) is configured substantially in a hat shape. The front pillar outer reinforcement 170 is disposed with its opening side on the vehicle width direction inside (vehicle cabin inside), and includes an apex wall portion 170A of a specific width, and a pair of side wall portions 170B, 170C that are respectively bent at obtuse angles toward the vehicle lower inside or the vehicle width direction inside from both width direction end portions of the apex wall portion 170A.

As illustrated in FIG. 12 to FIG. 14, the vehicle body side section 152 described above (the portion C 166C of the front pillar 150) is provided with an elongated reinforcement member 172, serving as a third reinforcement member, straddling an upper end portion of the front side opening flange 162A, this being the portion on the front pillar side of the door opening flange 162. As illustrated in FIG. 15, the reinforcement member 172 is disposed so as to fit together with the vehicle width direction inside of the front pillar outer reinforcement 170. Note that the reinforcement member 172 is, for example, a press formed component. The reinforcement member 172 is configured with a similar cross-section profile to the front pillar outer reinforcement 170, and is configured including an apex wall portion 172A, and a pair of side wall portions 172B, 172C. The extension directions of the pair of side wall portions 172B, 172C with respect to the apex wall portion 172A are the same as the extension directions of the pair of side wall portions 170B, 170C with respect to the apex wall portion 170A of the front pillar outer reinforcement 170.

Figure 16:
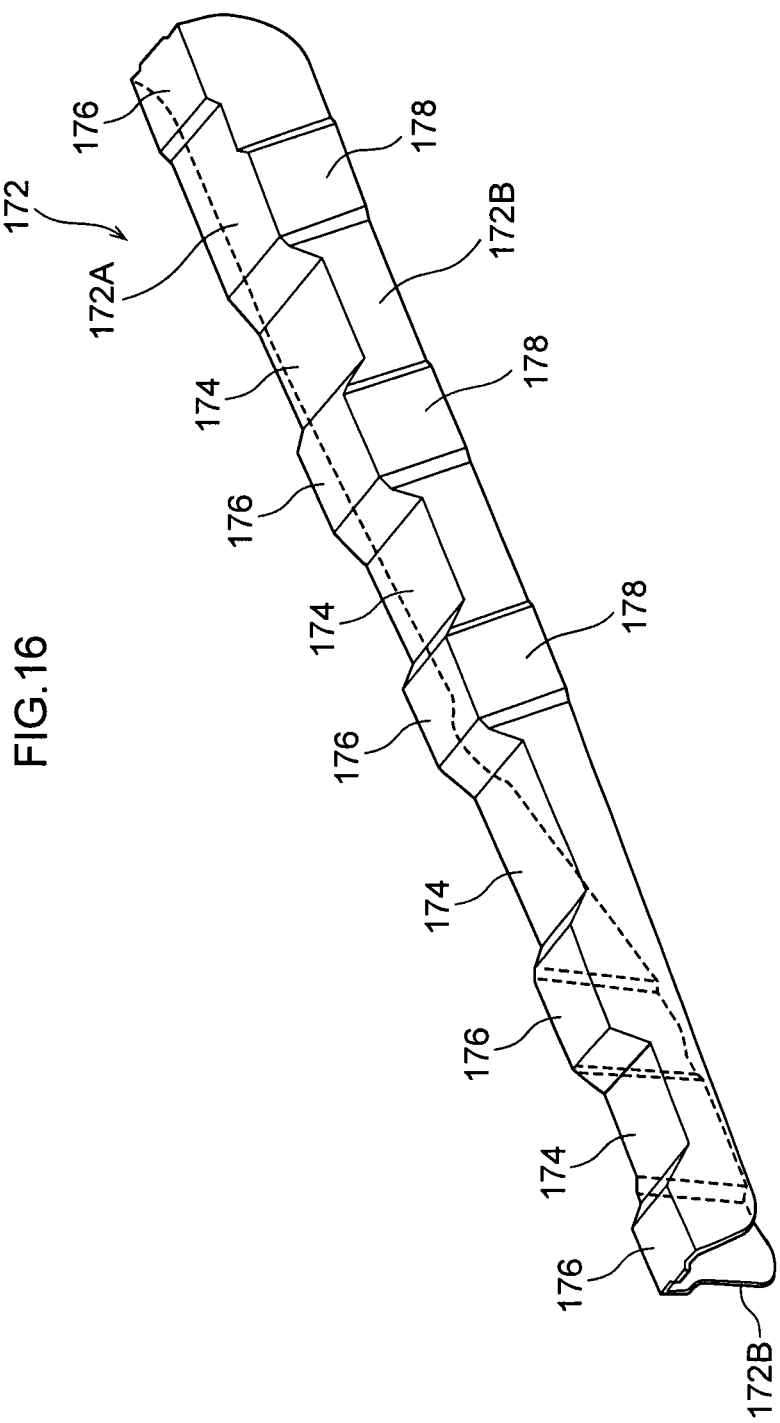
FIG. 16 is an enlarged perspective view illustrating the reinforcement member illustrated in FIG. 13 in isolation.

As illustrated in FIG. 13, FIG. 14, and FIG. 16, the apex wall portion 172A of the reinforcement member 172 is integrally formed with plural vertical beads 174, serving as rigidity tuning portions at specific intervals in the length direction of the member. The vertical beads 174 are formed in recessed groove shapes by pressing the apex wall portion 172A such that it protrudes toward the vehicle width direction inside (vehicle cabin inside). Each of the vertical beads 174 is configured by the three faces; namely a bottom face and two end faces. Plural attachment faces (spot welding faces) 176 protruding out toward the vehicle width direction outside are integrally formed between one vertical bead 174 and another vertical bead 174. The attachment faces 176 are relatively formed portions resulting from forming the vertical beads 174 that form protrusions toward the vehicle width direction inside. Employing the attachment faces 176, the reinforcement member 172 is joined by spot welding or the like to the apex wall portion 170A of the front pillar outer reinforcement 170. The pair of side wall portions 172B, 172C are also integrally formed with separate attachment faces 178, and these attachment faces 178 are employed to join the side wall portion 172B to the side wall portion 170B by spot welding or the like, and to join the side wall portion 172C to the side wall portion 170C by spot welding or the like.

In a state in which the reinforcement member 172 is attached to the front pillar outer reinforcement 170 in this manner, the vertical beads 174 are disposed orthogonally to two ridge line portions 180 of the apex wall portion 170A of the front pillar outer reinforcement 170. In the present exemplary embodiment, an angle θ formed between a bead center line of each of the vertical beads 174 and the ridge line portions 180 is set at 90°. However, θ does not necessarily have to be 90°, and may be any angle at which the beads can obtain a reinforcing effect. Accordingly, no performance issues arise provided that θ is within a range of from 85° to 95°, for example. The term "orthogonal" in claim 4 may be understood similarly, and provided the advantageous effects of the present invention are obtained, there is no limitation to cases that are strictly orthogonal, and cases intersecting at angles other than 90° are included. It is not necessary to provide plural of the vertical beads 174, and a single vertical bead 174 may be provided. Moreover, in the present exemplary embodiment, the recessed groove-shaped vertical beads 174 are employed as rigidity tuning portions; however there is no limitation thereto, and the rigidity may be tuned by varying the plate thickness, or by providing ribs, providing openings, or the like.

As illustrated in FIG. 13, as viewed from the side of the apex wall portion 172A of the reinforcement member 172, the plural vertical beads 174 (four in the present exemplary embodiment) described above are disposed on an extension line of the front side opening flange 162A of the door opening flange 162, and to the vehicle front side thereof.

Next, explanation follows regarding operation and advantageous effects of the present exemplary embodiment.

First, simple explanation follows regarding transmission of force in a frontal collision, and particularly in a small overlap collision, in a vehicle with a front pillar 150 that is provided with the fixed window 164, but is not provided with the reinforcement member 172. As illustrated in FIG. 12, with such a configuration, in a small overlap collision, the wheel-body of a front wheel 182 (see FIG. 2 of the first exemplary embodiment) contacts a lower portion (namely, a portion facing the wheel in the vehicle front-rear direction) 184 of the portion A 166A of the front pillar body 166, and presses the lower portion 184 toward the vehicle rear side due to the collision load. The load input at this point is labeled "F1". The lower portion 184 side of the front pillar 150 accordingly undergoes folding deformation, and collision load F2 that has not been completely absorbed travels through the front side opening flange 162A of the door opening flange 162 and pushes up a location spanning from the portion C 166C of the front pillar body 166 to the roof side rail 158 toward the vehicle upper side. As a result, a vertical bending moment M1 arises at a location of the front pillar outer reinforcement 170 where the auxiliary pillar portion 168 and the roof side rail 158 intersect with each other. If the reinforcement member 172 of the present exemplary embodiment were not provided, it is conceivable that this vertical bending moment M1 could cause folding deformation to occur at the location spanning from the portion C 166C of the front pillar body 166 to the roof side rail 158.

In the present exemplary embodiment, the elongated reinforcement member 172 on the vehicle width direction inside of the front pillar outer reinforcement 170 is disposed so as to straddle the upper end portion of the front side opening flange 162A of the door opening flange 162 as viewed from the side of the vehicle. A force to resist the vertical bending moment M1 (bending moment in a direction to cancel out the M1) is accordingly obtained. The location spanning from the portion C 166C (upper portion) of the front pillar body 166 of the front pillar 150 to the roof side rail 158 accordingly does not fold readily. As a result, the present exemplary embodiment enables folding of the vehicle body framework with a hollow closed cross-section structure partway between the portion C 166C (upper portion) of the front pillar 150 and the front portion of the roof side rail 158 to be suppressed or prevented in a frontal collision.

In the present exemplary embodiment, the reinforcement member 172 is provided with the plural recessed groove-shaped vertical beads 174 formed orthogonally to the plural (two) ridge line portions 180 of the front pillar outer reinforcement 170. This thereby enables the strength and rigidity along the length direction of the front pillar outer reinforcement 170 to be increased. The location spanning from the portion C 166C (upper portion) of the front pillar body 166 of the front pillar 150 to the roof side rail 158 is accordingly even less liable to fold. As a result, the present exemplary embodiment is capable of even more effectively suppressing or preventing folding partway along the vehicle body framework with a hollow closed cross-section structure spanning from the portion C (upper portion) of the front pillar 150 to the front portion of the roof side rail 158 in a frontal collision. Note that this advantageous effect promotes an advantageous effect of effectively suppressing or preventing splitting of a join portion between the dash panel, not illustrated in the drawings, that partitions the power unit chamber from the cabin, and the front pillar 150.

Figure 17A:
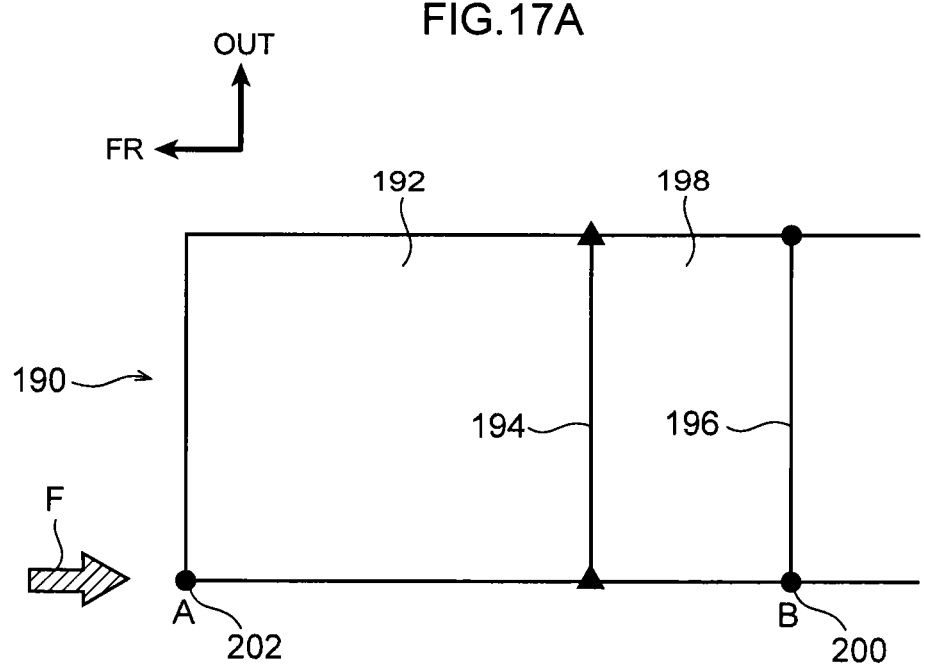
FIG. 17A is a plan view representing a vehicle according to a comparative example.
Figure 17B:
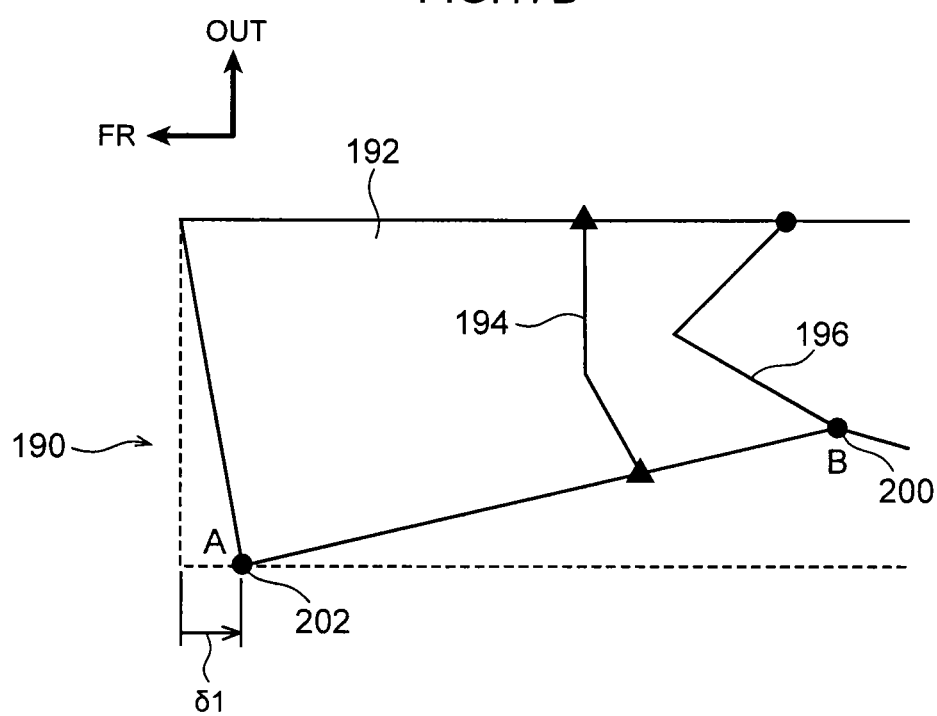
FIG. 17B is a plan view illustrating a state in which the vehicle illustrated in FIG. 17A has been involved in a small overlap collision.

The present exemplary embodiment further obtains the following operation and advantageous effects. FIG. 17A is a schematic plan view illustrating a vehicle 190 that is not provided with the reinforcement member 172 of the present exemplary embodiment. As illustrated in FIG. 17A, a member spanning across the vehicle width direction along an upper end portion of a windshield glass 192 (the rear end portion in FIG. 17A) is a front header panel 194, and a member spanning across parallel thereto at the vehicle rear side thereof is roof center reinforcement 196. When the vehicle 190 is involved in a small overlap collision and collision load F is input at a point A, the largest bending moment acts on a point B close to a fixed end (a join point between a roof panel 198, the roof center reinforcement 196, and a center pillar 200). Accordingly, as illustrated in FIG. 17B, the roof center reinforcement 196 undergoes folding deformation, and a front pillar 202 (point A) retreats by a distance of δ1.

Figure 18A:
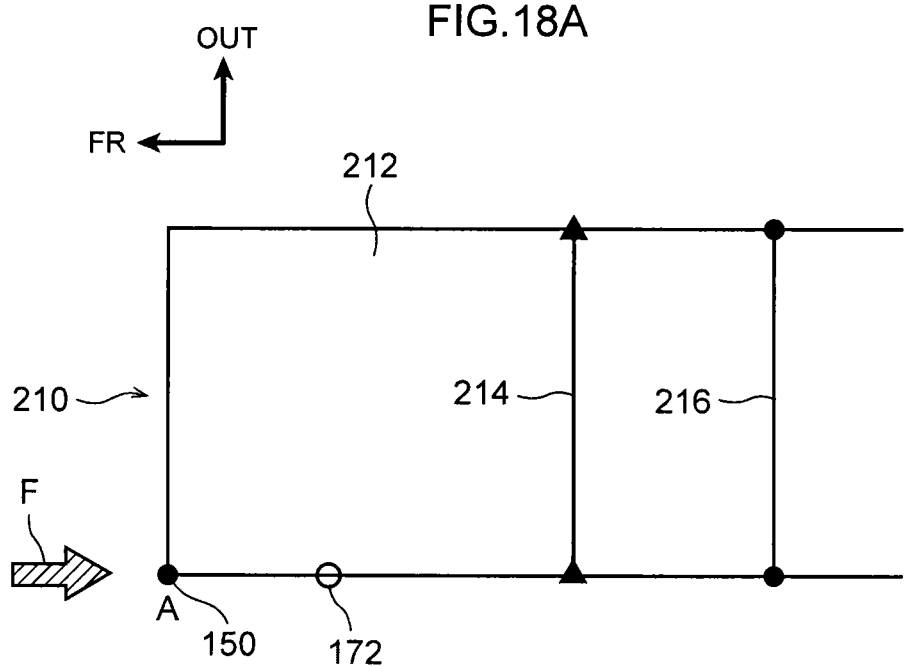
FIG. 18A is a plan view representing a vehicle provided with the vehicle body structure illustrated in FIG. 12.
Figure 18B:
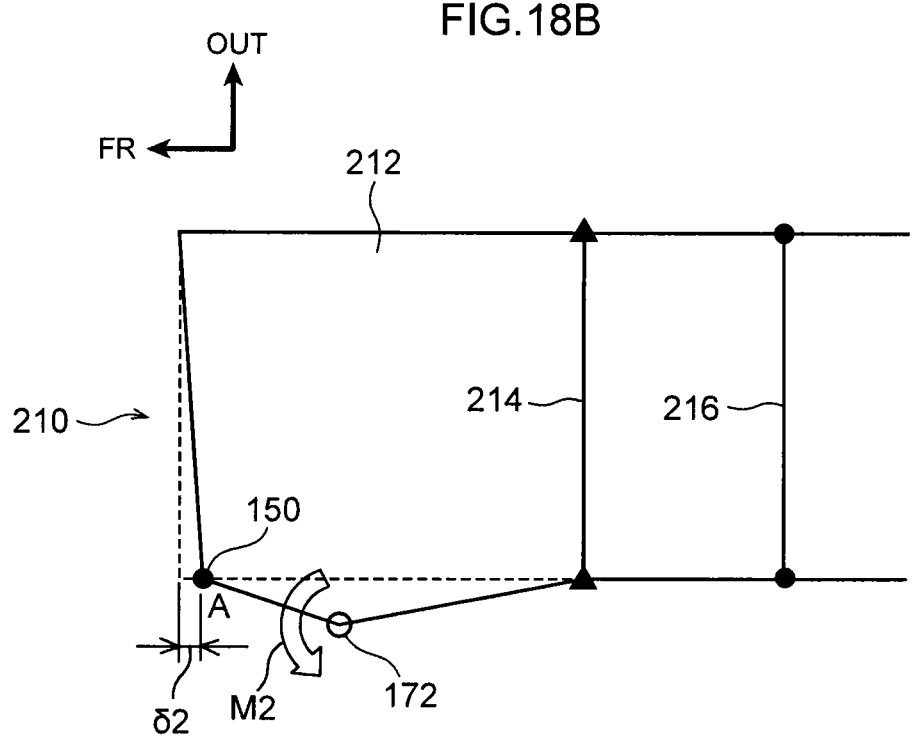
FIG. 18B is a plan view illustrating a state in which the vehicle illustrated in FIG. 18A has been involved in a small overlap collision.

However, in the present exemplary embodiment, as described above, the reinforcement member 172 is provided with the plural vertical beads 174 formed orthogonally to the plural (two) ridge line portions 180 of the front pillar outer reinforcement 170. FIG. 18A is a schematic plan view illustrating a vehicle 210 provided with the reinforcement member 172 of the present exemplary embodiment. Note that this is shown similarly to the vehicle 190 illustrated in FIG. 17A, with the exception of the provision of the reinforcement member 172. Namely, a front header panel 214 spans across in the vehicle width direction along an upper end portion (the rear end portion in FIG. 18A) of a windshield glass 212, and roof center reinforcement 216 spans across parallel thereto at a vehicle rear side thereof. The reinforcement member 172 is formed with the vertical beads 174 described above, thereby strengthening the front pillar outer reinforcement 170 with respect to the vertical bending moment M1 as described above. However, the surface area of the pair of side wall portions 172B, 172C of the reinforcement member 172 is reduced by an amount commensurate with forming the vertical beads 174 configured by recessed beads. Accordingly, as illustrated in FIG. 18B, when the vehicle 210 is involved in a small overlap collision, and a horizontal bending moment M2 is input that attempts to fold a location spanning from the upper portion of the front pillar 150 to the roof side rail 158 toward the vehicle width direction outside, the vertical beads 174 function as weakened portions and act as folding origin points. As a result, an upper portion of the front pillar 150 (the portion C 166C of the front pillar body 166) undergoes folding deformation toward the vehicle width direction outside at the vehicle front side of the front side opening flange 162A of the door opening flange 162, absorbing a portion of the collision energy. As a result, the front pillar 150 (point A) only retreats by a distance 62, this being shorter than the distance δ1. The amount of load input to the roof center reinforcement 216 is thereby greatly reduced, and folding deformation of the roof center reinforcement 216, and therefore deformation of the cabin, is effectively suppressed or prevented. This thereby enables the reinforcement member 172 of the present exemplary embodiment to effectively suppress folding deformation caused by the vertical bending moment M1 on the location from the upper portion of the front pillar 150 to the roof side rail 158, and to promote folding deformation caused by the horizontal bending moment M2.

Accordingly, in the present exemplary embodiment, the reinforcement member 172 exhibits a reinforcing effect with respect to the vertical bending moment M1 acting to vertically fold the plural ridge line portions 180 of the front pillar outer reinforcement 170 in the vehicle up-down direction, and is provided with the one, or two or more, rigidity tuning portions (vertical beads 172) formed as folding origin points with respect to the horizontal bending moment M2 acting to horizontally fold the plural ridge line portions 180 in the vehicle width direction. Accordingly, the front pillar outer reinforcement 170 amply resists the vertical bending moment M1 acting in a collision such as a small overlap collision, thereby suppressing folding deformation, and at the same time undergoes folding deformation toward the vehicle width direction outside, thereby absorbing a portion of the collision energy. The amount by which the front pillar retreats is accordingly suppressed. This thereby enables the present exemplary embodiment to efficiently suppress folding deformation caused by the vertical bending moment M1, and promote folding deformation caused by the horizontal bending moment M2.

Since the rigidity tuning portion described above is configured by the recessed groove-shaped vertical beads 174, rigidity can be easily modified using the width and depth of the beads, for example. As a result, the present exemplary embodiment enables easy tuning of the balance between vertical folding and horizontal folding.

The invention claimed is:

1. A vehicle body structure, comprising:
a front pillar outer reinforcement that is disposed on a vehicle width direction outer side of a front pillar, and that is disposed along a vehicle front-rear direction along an extension line of a roof side rail;
an auxiliary pillar portion that configures a portion of the front pillar, that extends in a vehicle vertical direction along a rear end portion of a fixed window disposed at a vehicle lower side of the front pillar outer reinforcement, and that has a front pillar side portion of a door opening flange, which is disposed around a peripheral edge portion of a door opening section of a side door, formed at a vehicle rear side end portion thereof; and
an elongated reinforcement member that is disposed on the vehicle width direction inner side of the front pillar outer reinforcement so as to straddle the front pillar side portion of the door opening flange.

2. The vehicle body structure of claim 1, wherein:
the front pillar outer reinforcement includes a plurality of ridge line portions that extend along a length direction of the front pillar outer reinforcement in a row in the vehicle width direction; and
the reinforcement member exhibits a reinforcing effect with respect to a vertical bending moment acting to vertically fold the plurality of ridge line portions in the vehicle vertical direction, and includes one, or two or more, rigidity tuning portions formed so as to act as folding origin points with respect to a horizontal bending moment acting to horizontally fold the plurality of ridge line portions in the vehicle width direction.

3. The vehicle body structure of claim 2, wherein the rigidity tuning portion is a recessed groove-shaped vertical bead formed orthogonally to the plurality of ridge line portions.

\* \* \* \* \*